(12) United States Patent
Tokuchi

(10) Patent No.: US 10,706,606 B2
(45) Date of Patent: Jul. 7, 2020

(54) INFORMATION PROCESSING APPARATUS FOR MODIFYING A GRAPHICAL OBJECT BASED ON SENSOR INPUT

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 10 days.

(21) Appl. No.: 15/943,713

(22) Filed: Apr. 3, 2018

(65) Prior Publication Data

US 2019/0066357 A1    Feb. 28, 2019

(30) Foreign Application Priority Data

Aug. 24, 2017 (JP) ................................. 2017-161182

(51) Int. Cl.

| | | |
|---|---|---|
| G06T 19/20 | (2011.01) | |
| G06T 15/00 | (2011.01) | |
| G06T 7/70 | (2017.01) | |
| G06K 9/20 | (2006.01) | |
| G06T 15/08 | (2011.01) | |
| G06T 7/00 | (2017.01) | |

(52) U.S. Cl.
CPC ............ *G06T 15/005* (2013.01); *G06K 9/209* (2013.01); *G06T 7/0002* (2013.01); *G06T 7/70* (2017.01); *G06T 15/00* (2013.01); *G06T 15/08* (2013.01); *G06T 19/20* (2013.01); *G06T 2207/30192* (2013.01); *G06T 2215/16* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 9,524,701 B2 | 12/2016 | Song et al. | |
| 2003/0222833 A1 | 12/2003 | Nakai | |
| 2013/0141435 A1* | 6/2013 | Cho | G06T 15/50 345/426 |
| 2013/0241921 A1* | 9/2013 | Kurtenbach | G06T 15/20 345/419 |
| 2013/0300732 A1* | 11/2013 | Hosoya | G06F 1/1652 345/419 |

(Continued)

FOREIGN PATENT DOCUMENTS

| | | |
|---|---|---|
| JP | 2002090326 | 3/2002 |
| JP | 2002314649 | 10/2002 |

(Continued)

OTHER PUBLICATIONS

"Office Action of Japan Counterpart Application," dated Apr. 3, 2018,with English translation thereof, p. 1-p. 6.

(Continued)

*Primary Examiner* — Xiao M Wu
*Assistant Examiner* — Steven Z Elbinger
(74) *Attorney, Agent, or Firm* — JCIPRNET

(57) ABSTRACT

An information processing apparatus includes a display, at least one detector, and a display controller. The display displays an image of an object three-dimensionally. The at least one detector detects a physical quantity as a detection target. The display controller makes a change to a specific part of the object displayed on the display in accordance with an output from the at least one detector.

20 Claims, 31 Drawing Sheets

(56) References Cited

U.S. PATENT DOCUMENTS

| | | | |
|---|---|---|---|
| 2014/0019910 A1* | 1/2014 | Kim | G06F 3/04817 715/810 |
| 2014/0049464 A1* | 2/2014 | Kwak | G06F 3/0487 345/156 |
| 2016/0151696 A1* | 6/2016 | Chen | A63B 69/3614 473/199 |
| 2017/0329766 A1* | 11/2017 | Matsuyama | G06F 13/00 |
| 2018/0020328 A1* | 1/2018 | Monnin | H04M 1/72522 |
| 2018/0033211 A1* | 2/2018 | Berman | G06T 19/20 |
| 2018/0136812 A1 | 5/2018 | Kim et al. | |
| 2018/0229448 A1* | 8/2018 | Bastian | B33Y 10/00 |

FOREIGN PATENT DOCUMENTS

| | | | |
|---|---|---|---|
| JP | 2002314649 A * | 10/2002 | |
| JP | 2004-004281 | 1/2004 | |
| JP | 2006520053 | 8/2006 | |
| JP | 2012038337 | 2/2012 | |
| JP | 2012128825 | 7/2012 | |
| JP | 2012128825 A * | 7/2012 | G06F 1/1626 |
| JP | 2014021983 | 2/2014 | |
| JP | 2014-110628 | 6/2014 | |
| JP | 2016511852 | 4/2016 | |
| JP | 2017072874 | 4/2017 | |
| WO | 2004079530 | 9/2004 | |
| WO | 2014038109 | 3/2014 | |
| WO | 2016092924 | 6/2016 | |

OTHER PUBLICATIONS

"Office Action of Japan Counterpart Application," with partial English translation thereof, dated Jun. 5, 2018, p. 1-p. 5.

Office Action of Japan Counterpart Application, with English translation thereof, dated Sep. 25, 2018, pp. 1-2.

Office Action of Japan Counterpart Application, with English translation thereof, dated Sep. 3, 2019, pp. 1-5.

"Office Action of Japan Counterpart Application," with English translation thereof, dated Nov. 19, 2019, p. 1-p. 8.

* cited by examiner

FIG. 31

| 60 | | ONE-DIMENSIONAL SENSOR VALUE | TWO-DIMENSIONAL SENSOR VALUE | THREE-DIMENSIONAL SENSOR VALUE |
|---|---|---|---|---|
| OBJECT AS TARGET TO WHICH CHANGE IS MADE | ONE-DIMENSIONAL IMAGE | CHANGED IMAGE 1 (1–N) | CHANGED IMAGE 2 (1–M) | CHANGED IMAGE 3 (1–L) |
| | TWO-DIMENSIONAL IMAGE | CHANGED IMAGE 4 (1–N) | CHANGED IMAGE 5 (1–M) | CHANGED IMAGE 6 (1–L) |
| | THREE-DIMENSIONAL IMAGE | CHANGED IMAGE 7 (1–N) | CHANGED IMAGE 8 (1–M) | CHANGED IMAGE 9 (1–L) |

61 72 73 74

INFORMATION PROCESSING APPARATUS FOR MODIFYING A GRAPHICAL OBJECT BASED ON SENSOR INPUT

CROSS-REFERENCE TO RELATED APPLICATIONS

This application is based on and claims priority under 35 USC 119 from Japanese Patent Application No. 2017-161182 filed Aug. 24, 2017.

BACKGROUND

(i) Technical Field

The present invention relates to an information processing apparatus.

(ii) Related Art

Techniques for displaying an object three-dimensionally include a method using a single display screen, a method using plural display screens arranged three-dimensionally, a method using a three-dimensional display, and the like.

SUMMARY

According to a first aspect of the invention, there is provided an information processing apparatus including a display, at least one detector, and a display controller. The display displays an image of an object three-dimensionally. The at least one detector detects a physical quantity as a detection target. The display controller makes a change to a specific part of the object displayed on the display in accordance with an output from the at least one detector.

According to a second aspect of the invention, in the information processing apparatus according to the first aspect, on the basis of a position at which the at least one detector detects pressure, the display controller determines the part to which the change is to be made.

According to a third aspect of the invention, in the information processing apparatus according to the second aspect, the display controller changes a degree of the change to be made to the object in accordance with a strength of the detected pressure.

According to a fourth aspect of the invention, in the information processing apparatus according to the third aspect, the strength is a total of results of plural times of detection.

According to a fifth aspect of the invention, in the information processing apparatus according to the third aspect, display content of the specific part is changed in accordance with a temporal change of the strength.

According to a sixth aspect of the invention, in the information processing apparatus according to the second aspect, the at least one detector includes plural detectors, and the display controller calculates a direction of an external force that acts on the object on the basis of a distribution of strengths of pressure detected by the plural detectors.

According to a seventh aspect of the invention, in the information processing apparatus according to the sixth aspect, the part to which the change is to be made in the object displayed on the display is determined on the basis of the calculated direction of the external force.

According to an eighth aspect of the invention, in the information processing apparatus according to the first aspect, on the basis of a direction of acceleration detected by the at least one detector, the display controller determines the part to which the change is to be made in the object displayed on the display.

According to a ninth aspect of the invention, in the information processing apparatus according to the eighth aspect, the degree of the change to be made to the object is changed in accordance with a degree of the detected acceleration.

According to a tenth aspect of the invention, in the information processing apparatus according to the first aspect, the at least one detector includes plural detectors at different parts, and, on the basis of humidities detected by the plural detectors, the display controller determines the part to which the change is to be made in the object displayed on the display.

According to an eleventh aspect of the invention, in the information processing apparatus according to the tenth aspect, if one of the detected humidities exceeds a predetermined threshold, the display controller makes the change in such a manner that the determined part of the object is displayed to be wet.

According to a twelfth aspect of the invention, in the information processing apparatus according to the tenth aspect, if one of the detected humidities exceeds a predetermined threshold, the display controller makes the change in such a manner that clothing or footwear at the determined part is suitable for rainy weather or waterside.

According to a thirteenth aspect of the invention, in the information processing apparatus according to the first aspect, the at least one detector includes plural detectors at different parts, and on the basis of temperatures detected by the plural detectors, the display controller determines the part to which the change is to be made in the object displayed on the display.

According to a fourteenth aspect of the invention, in the information processing apparatus according to the first aspect, the at least one detector includes plural detectors at different parts, and on the basis of information on distortion detected on the basis of outputs from the plural detectors, the display controller determines the part to which the change is to be made in the object displayed on the display.

According to a fifteenth aspect of the invention, in the information processing apparatus according to the fourteenth aspect, the display controller changes a degree of the change to be made to the object in accordance with a degree of the detected distortion.

According to a sixteenth aspect of the invention, in the information processing apparatus according to the first aspect, the display controller makes the change in accordance with an elevation detected by the at least one detector.

According to a seventeenth aspect of the invention, in the information processing apparatus according to the first aspect, the display controller makes the change in accordance with an air pressure detected by the at least one detector.

According to an eighteenth aspect of the invention, in the information processing apparatus according to the first aspect, the display controller makes the change in accordance with an illuminance detected by the at least one detector.

According to a nineteenth aspect of the invention, in the information processing apparatus according to the first aspect, the at least one detector includes plural detectors, and in accordance with a combination of plural kinds of outputs from the plural detectors, the display controller makes the change to the specific part of the object displayed on the display.

According to a twentieth aspect of the invention, in the information processing apparatus according to the first aspect, in accordance with a combination of environmental information acquired from an outside and an output from the at least one detector, the display controller makes the change to the specific part of the object displayed on the display.

According to a twenty-first aspect of the invention, in the information processing apparatus according to the first aspect, the display controller outputs, to an image forming apparatus, print data corresponding to the object to which the change has been made, the object being displayed on the display.

According to a twenty-second aspect of the invention, in the information processing apparatus according to the first aspect, the display controller outputs, to an image forming apparatus, print data of the object that is prepared in advance regardless of a display state, even if the object to which the change has been made is displayed on the display.

According to a twenty-third aspect of the invention, in the information processing apparatus according to the first aspect, the display controller estimates a state of an actual product corresponding to the object under a use environment determined on the basis of an output from the at least one detector and reflects and displays the state.

According to a twenty-fourth aspect of the invention, in the information processing apparatus according to the first aspect, the at least one detector detects a position where the display, which is deformable, is deformed, and the display controller determines the part to which the change is to be made on the basis of the detected position.

According to a twenty-fifth aspect of the invention, in the information processing apparatus according to the twenty-fourth aspect, in a state in which the display is deformed from a first shape before bending into a second shape after bending, the display controller does not edit the image of the object displayed on the display across the bent position, and after the display is made into the first shape again from the second shape, the display controller displays a line at a portion where the image of the object overlaps with the bent position.

According to a twenty-sixth aspect of the invention, in the information processing apparatus according to the twenty-fourth aspect, in a state in which the display is deformed from a first shape before bending into a second shape after bending, the display controller does not edit the image of the object displayed on the display across the bent position, and after the display is made into the first shape again from the second shape, the display controller generates an image in which the image of the object is cut three-dimensionally along the bent position and displays the image.

According to a twenty-seventh aspect of the invention, there is provided a non-transitory computer readable medium storing a program causing a computer to execute a process for information processing, the process including: displaying an image of an object three-dimensionally; and making a change to a specific part of the object displayed on a display in accordance with an output from at least one detector that detects a physical quantity as a detection target.

According to a twenty-eighth aspect of the invention, there is provided an information processing apparatus including a display controller that determines a user's use environment on the basis of a combination of an output from a detector inside the information processing apparatus and environmental information acquired from an outside of the information processing apparatus and displays an object having content that is likely to occur in the use environment.

According to a twenty-ninth aspect of the invention, in the information processing apparatus according to the twenty-eighth aspect, if the use environment is an abnormal environment, the display controller displays the object in a display form in accordance with the abnormal environment.

According to a thirtieth aspect of the invention, in the information processing apparatus according to the twenty-eighth aspect, if the use environment is an abnormal environment, the display controller displays warning information.

According to a thirty-first aspect of the invention, in the information processing apparatus according to the twenty-eighth aspect, a change is made to the displayed object in such a manner that a degree of the change is increased and is then decreased.

According to a thirty-second aspect of the invention, in the information processing apparatus according to the twenty-eighth aspect, a degree of a change to be made to the displayed object is varied in accordance with the use environment.

According to a thirty-third aspect of the invention, in the information processing apparatus according to the twenty-eighth aspect, the environmental information is at least one of information regarding weather, information regarding crime prevention, and information regarding traffic.

According to a thirty-fourth aspect of the invention, in the information processing apparatus according to the twenty-eighth aspect, a change is made to a specific part of the object.

According to a thirty-fifth aspect of the invention, in the information processing apparatus according to the thirty-fourth aspect, a wing is added to the specific part.

According to a thirty-sixth aspect of the invention, in the information processing apparatus according to the thirty-fourth aspect, the change is made to a shape of a body of the object.

According to a thirty-seventh aspect of the invention, in the information processing apparatus according to the thirty-fourth aspect, the change is made to equipment of the object.

According to a thirty-eighth aspect of the invention, in the information processing apparatus according to the twenty-eighth aspect, the detector inside the information processing apparatus acquires at least one of positional information, pressure, acceleration, bending information, time, temperature, humidity, air pressure, elevation, water depth, magnetic pole, and sound.

According to a thirty-ninth aspect of the invention, in the information processing apparatus according to any one of the twenty-eighth to thirty-eighth aspects, the object is a character in a virtual space.

According to a fortieth aspect of the invention, there is provided a non-transitory computer readable medium storing a program causing a computer to execute a process for image processing, the process including determining a user's use environment on the basis of a combination of an output from a detector inside an information processing apparatus and environmental information acquired from an outside of the information processing apparatus and displaying an object having content that is likely to occur in the use environment.

BRIEF DESCRIPTION OF THE DRAWINGS

Exemplary embodiments of the present invention will be described in detail based on the following figures, wherein:

FIG. 31 illustrates an example of a correspondence table representing a correspondence relationship between objects as change targets in combination with numbers of dimensions of sensor values and changed images.

DETAILED DESCRIPTION

Now, exemplary embodiments of the present invention will be described in detail below with reference to the attached drawings.

Terminology

In the exemplary embodiments described below, "to display an object three-dimensionally" means to display the object in a manner including depth information by using a single display screen, plural display screens arranged three-dimensionally, a so-called three-dimensional display, or the like.

A method using a single display screen includes a case of displaying a two-dimensional image (image including information regarding perspective) obtained by actually taking a picture of an object that is present in a real space, a case of displaying a two-dimensional image representing an object defined in a three-dimensional space from one perspective, and the like. Here, examples of the object defined in a three-dimensional space include a character in a virtual space, a three-dimensional image reconstructed from tomographic images, and the like.

In addition, the method using plural display screens arranged three-dimensionally includes a case of displaying on the respective display screens, plural two-dimensional images obtained by observing an object defined in a three-dimensional space from plural perspectives (corresponding to arrangement positions of the display screens).

In addition, the method using a three-dimensional display includes a method requiring an observer to wear glasses having special optical characteristics, a method requiring no such special glasses, a method requiring an observer to wear a head-mounted display on the head, and the like. Examples of the method requiring no glasses include a method using the phenomenon that air at the focal point of condensed laser beams changes into plasma and emits light.

However, as long as the object is represented three-dimensionally, information corresponding to the object does not have to necessarily include internal information (voxel defining volume data), and may be, for example, a collection of multi faces (polygon mesh).

In the exemplary embodiments described below, "to display an object two-dimensionally" means to display the object in a manner not containing depth information by using a single display screen, plural display screens arranged three-dimensionally, a so-called three-dimensional display, or the like.

In the exemplary embodiments, an object defined in a three-dimensional space is referred to as a three-dimensional object, and an object defined in a two-dimensional space is referred to as a two-dimensional object.

An object may alternatively be displayed three-dimensionally by displaying two-dimensional objects corresponding to plural display apparatuses arranged three-dimensionally.

The object in the exemplary embodiments may be displayed as a still image or a moving image.

First Exemplary Embodiment

Apparatus Configuration

Figure 1:
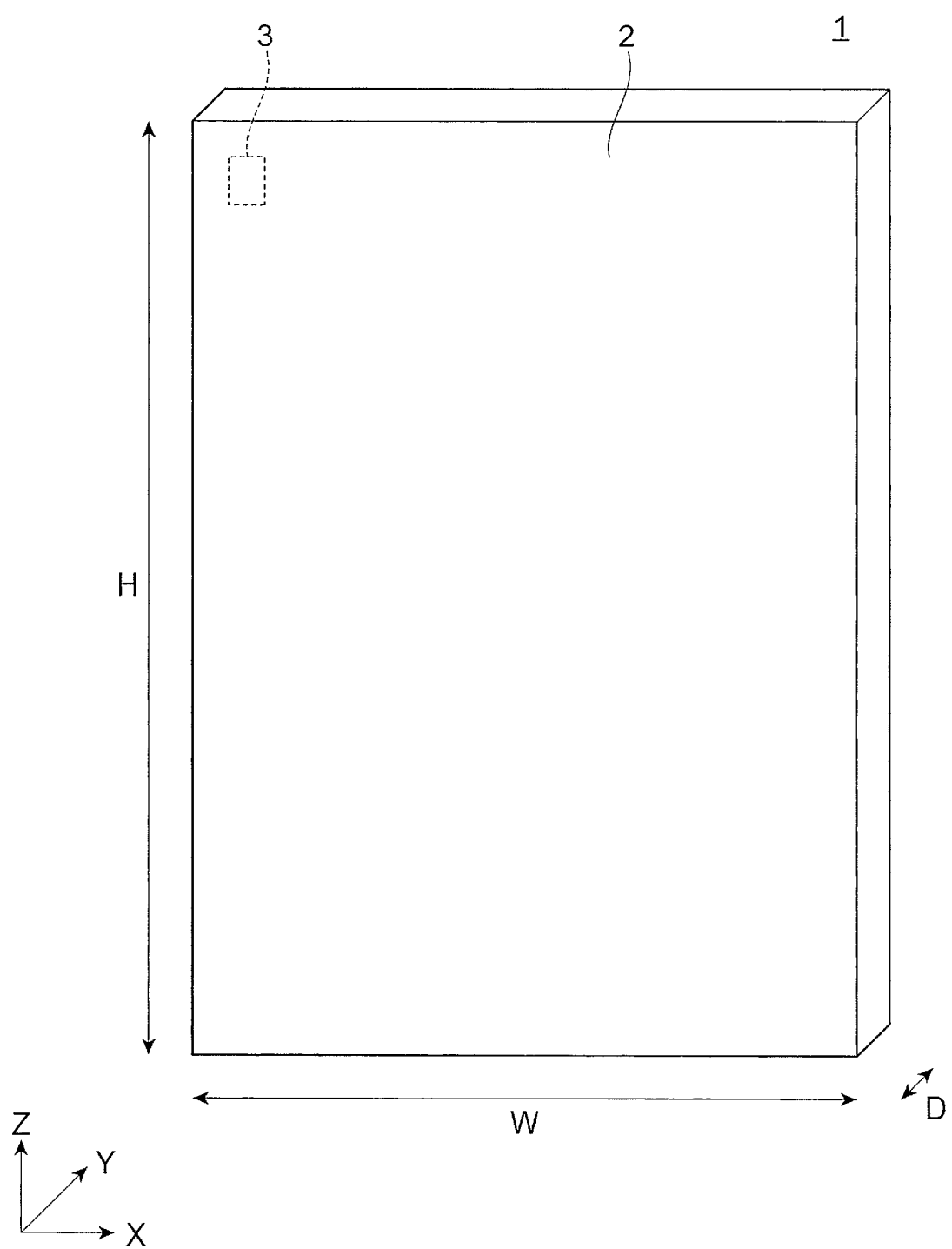
FIG. 1 illustrates an appearance example of an information processing apparatus according to a first exemplary embodiment.

FIG. 1 illustrates an appearance example of an information processing apparatus 1 according to a first exemplary embodiment.

The information processing apparatus 1 according to the first exemplary embodiment is, for example, assumed to be a mobile information terminal such as a tablet computer or a smartphone.

The information processing apparatus 1 illustrated in FIG. 1 includes six flat faces, among which a display 2 is arranged on a face. Note that all of the faces of the information processing apparatus 1 are not necessarily flat. In other words, one or more faces may be curved.

In the example illustrated in FIG. 1, a face on which the display 2 is provided is referred to as a front face, faces positioned left and right of the display 2 are referred to as side faces, and a face opposite to the display 2 is referred to as a back face or a rear face. In addition, a face positioned above the display 2 is referred to as a top face, and a face positioned below the display 2 is referred to as a bottom face.

In the case of the information processing apparatus 1 illustrated in FIG. 1, the shape of the front face is a rectangle in which a length H in the Z direction (height) is longer than a length W in the X direction (width). In addition, a length D in the Y direction (depth) defining the side surfaces of the information processing apparatus 1 is shorter than the length W in the X direction (width).

The display 2 is configured from a thin film display such as a liquid crystal display or an organic electroluminescent (EL) display. If the display 2 is a liquid crystal display, a light source (not illustrated) is also provided.

A controller 3 that controls operations of the units including the display 2 and other components (not illustrated) are built in a housing of the information processing apparatus 1.

Figure 2:
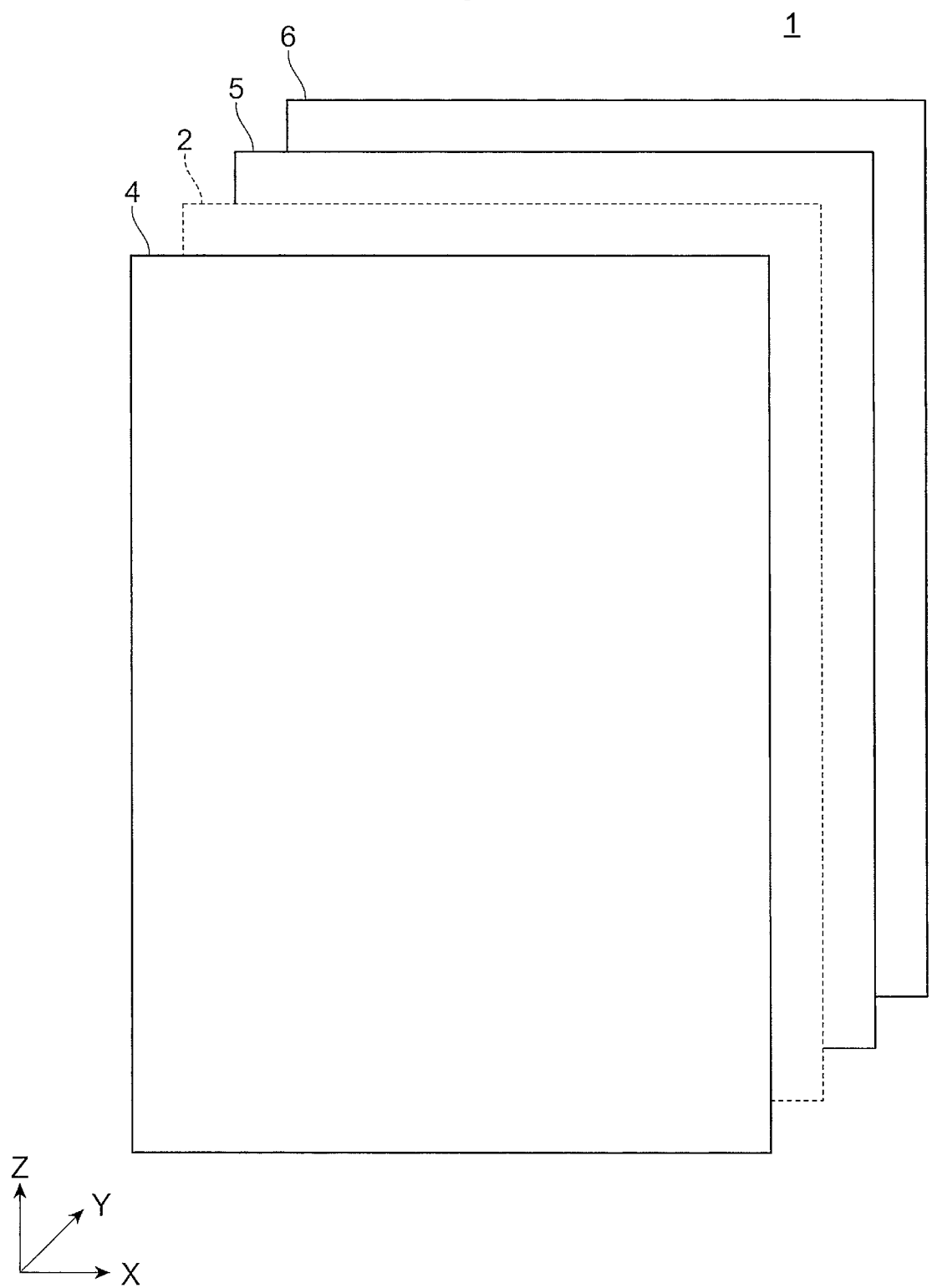
FIG. 2 illustrates an arrangement example of planar sensors.

FIG. 2 illustrates an arrangement example of planar sensors.

FIG. 2 illustrates a position detection sensor 4, a pressure detection sensor 5, and a distortion detection sensor 6.

The position detection sensor 4 is a sensor that detects the position of an input operation performed by a user and is stacked on the top face of the display 2. An electronic device combining the position detection sensor 4 with the display 2 is called a touch panel.

The position detection sensor 4 is an example of a detector. A detectable object differs according to a detection method. For example, in a case of using electrostatic capacitance for detection, parts of a person's body (e.g., fingertips) are detectable objects. For example, in a case of using infrared rays for detection, fingertips and other objects including pens are detectable objects.

The position detection sensor 4 outputs the coordinates of a detected object. The position detection sensor 4 according to the first exemplary embodiment is capable of detecting plural operation positions at a time.

The pressure detection sensor 5 is a sensor that detects the strength of pressure applied to an operation position at the time of an input operation and is provided on the rear face of the display 2, for example.

The pressure detection sensor 5 according to this exemplary embodiment is a capacitive pressure sensor and detects, as the strength of pressure, the degree of flexure generated in a body of the sensor formed in the form of a film. In the case of this exemplary embodiment, the pressure detection sensor 5 is capable of detecting some levels of pressure differences.

The distortion detection sensor 6 is a sensor that detects the degree of distortion generated in the body of the sensor and is provided on the rear face of the display 2.

As the distortion detection sensor 6 according to this embodiment, for example, a displacement sensor to which piezoelectricity of polylactic acid is applied, developed by Murata Manufacturing Co., Ltd., is used. In the case of this exemplary embodiment, the distortion detection sensor 6 is capable of detecting the direction and degree of distortion. The distortion is an example of a physical quantity by which, typically, a part is not directly determined.

The position detection sensor 4, the pressure detection sensor 5, and the distortion detection sensor 6 are each an example of a detector.

Figure 3:
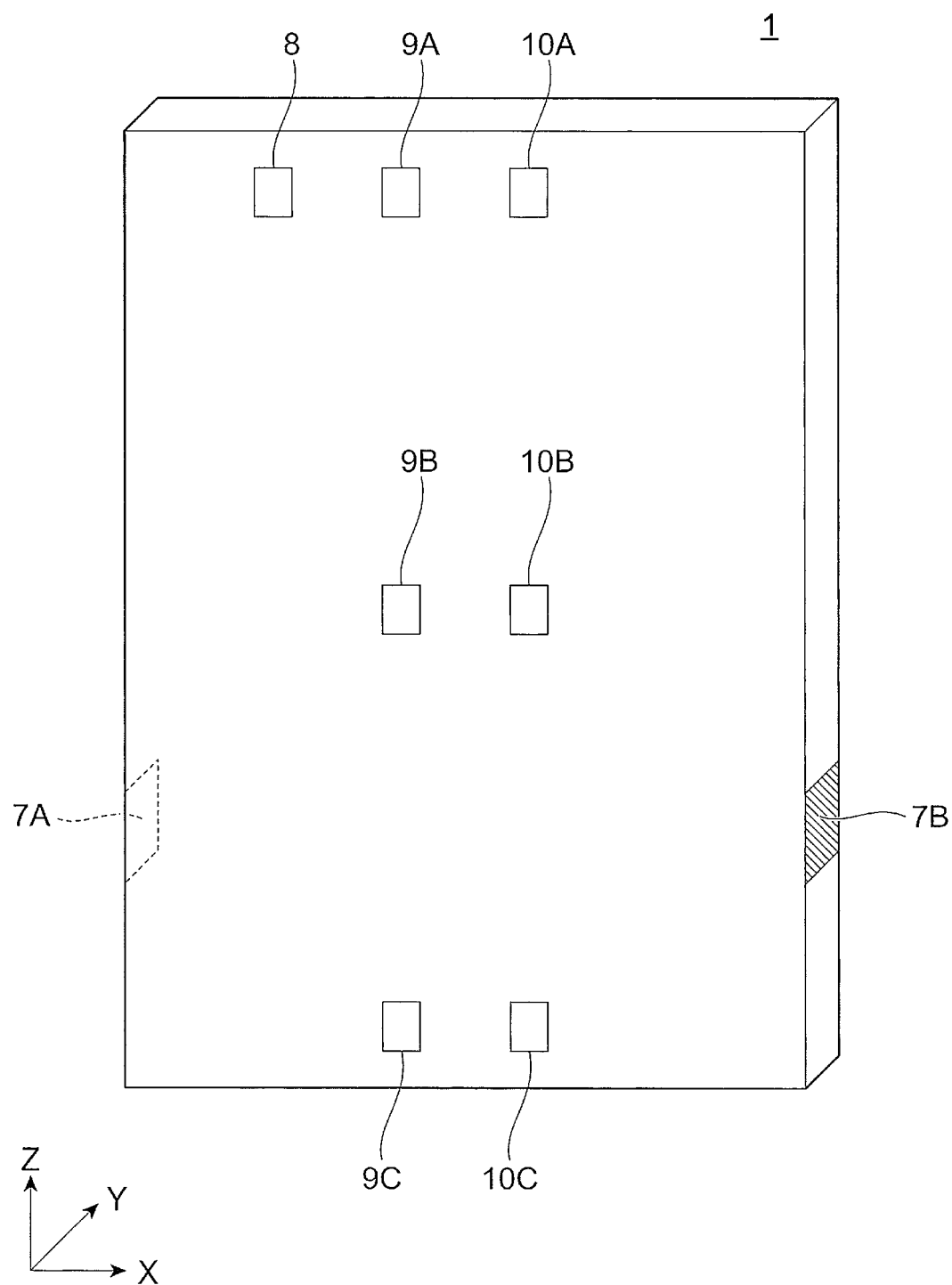
FIG. 3 illustrates an arrangement example of other sensors.

FIG. 3 illustrates an arrangement example of other sensors.

The information processing apparatus 1 illustrated in FIG. 3 includes, inside the housing, pressure detection sensors 7A and 7B that detect the strength of pressure applied locally to lower portions of the side surfaces, an acceleration detection sensor 8 that detects the direction and value of acceleration applied to the body, temperature detection sensors 9A, 9B, and 9C that detect temperatures, and humidity detection sensors 10A, 10B, and 10C that detect humidities.

The number of temperature detection sensors and the number of humidity detection sensors may each be one.

The pressure detection sensors 7A and 7B according to this exemplary embodiment are capable of detecting some strength levels of pressure applied to the side surfaces of the information processing apparatus 1.

The temperature detection sensors 9A, 9B, and 9C are used for detection of the temperature (ambient temperature) of the space where the information processing apparatus 1 is used and also are used for detection of the temperature of a local area. The temperature is an example of a physical quantity by which, typically, a part is not directly determined.

The humidity detection sensors 10A, 10B, and 10C are used for detection of the humidity of the space where the information processing apparatus 1 is used and also are used for detection of the humidity of a local area. The humidity is an example of a physical quantity by which, typically, a part is not directly determined.

The pressure detection sensors 7A and 7B, the acceleration detection sensor 8, the temperature detection sensors 9A, 9B, and 9C, and the humidity detection sensors 10A, 10B, and 10C are each an example of a detector.

Figure 4:
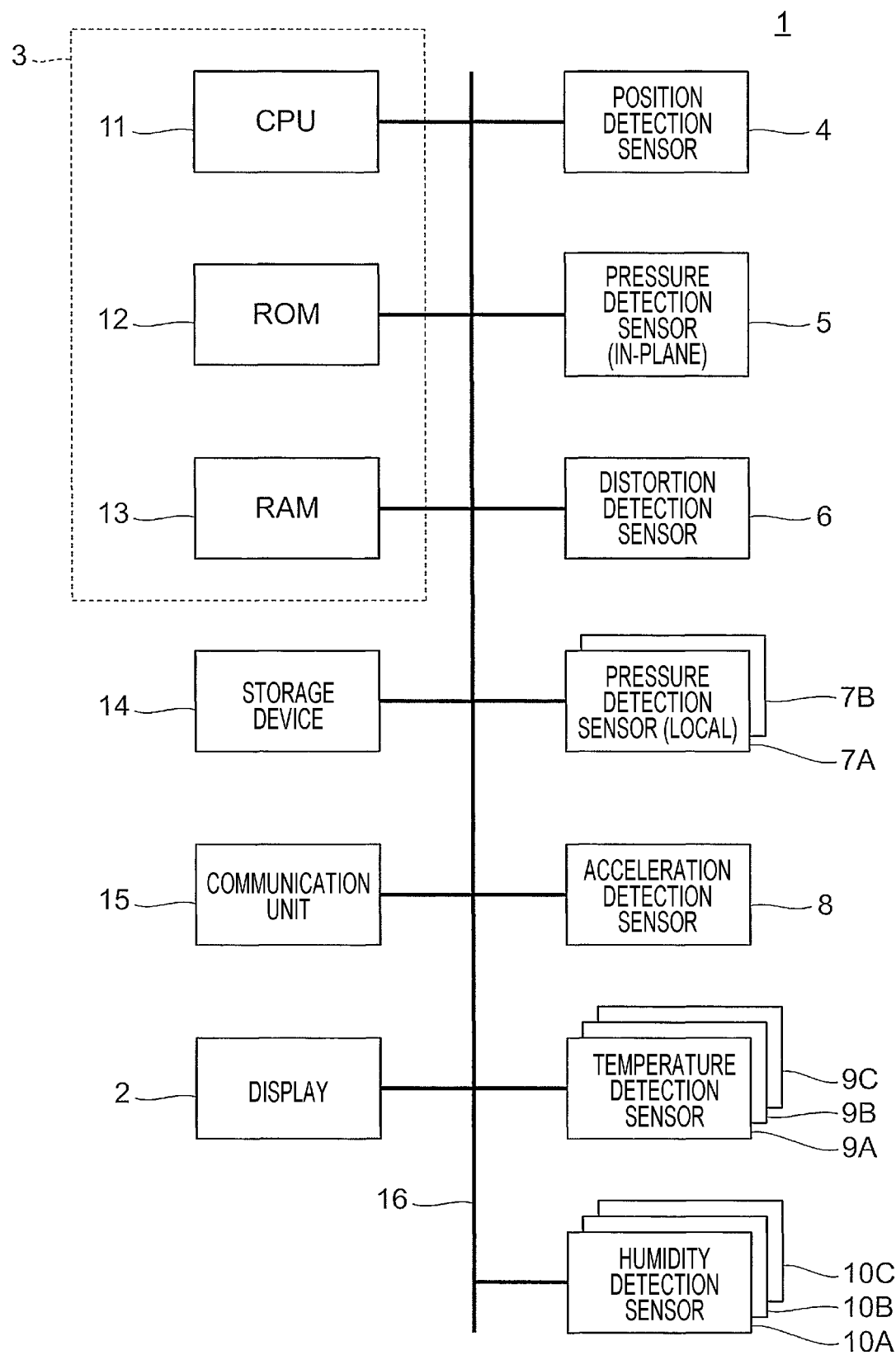
FIG. 4 illustrates a hardware configuration example of the information processing apparatus.

FIG. 4 illustrates a hardware configuration example of the information processing apparatus 1.

The information processing apparatus 1 according to this exemplary embodiment includes, in addition to the above-described devices, a non-volatile storage device 14 used for data storage and a communication unit 15. These devices transmit and receive data via a bus 16.

Note that the controller 3 includes a central processing unit (CPU) 11 that executes data processing, a read only memory (ROM) 12 that stores programs and the like such as basic input/output system (BIOS) and firmware, and a random access memory (RAM) 13 used as a work area.

The storage device 14 according to this exemplary embodiment is configured from, for example, a semiconductor memory or a hard disk device.

The communication unit 15 is a communicator used for communication with an external apparatus. A variety of schemes are used for communication. Note that the communication path may be a wired path or a wireless path.

Figure 5:
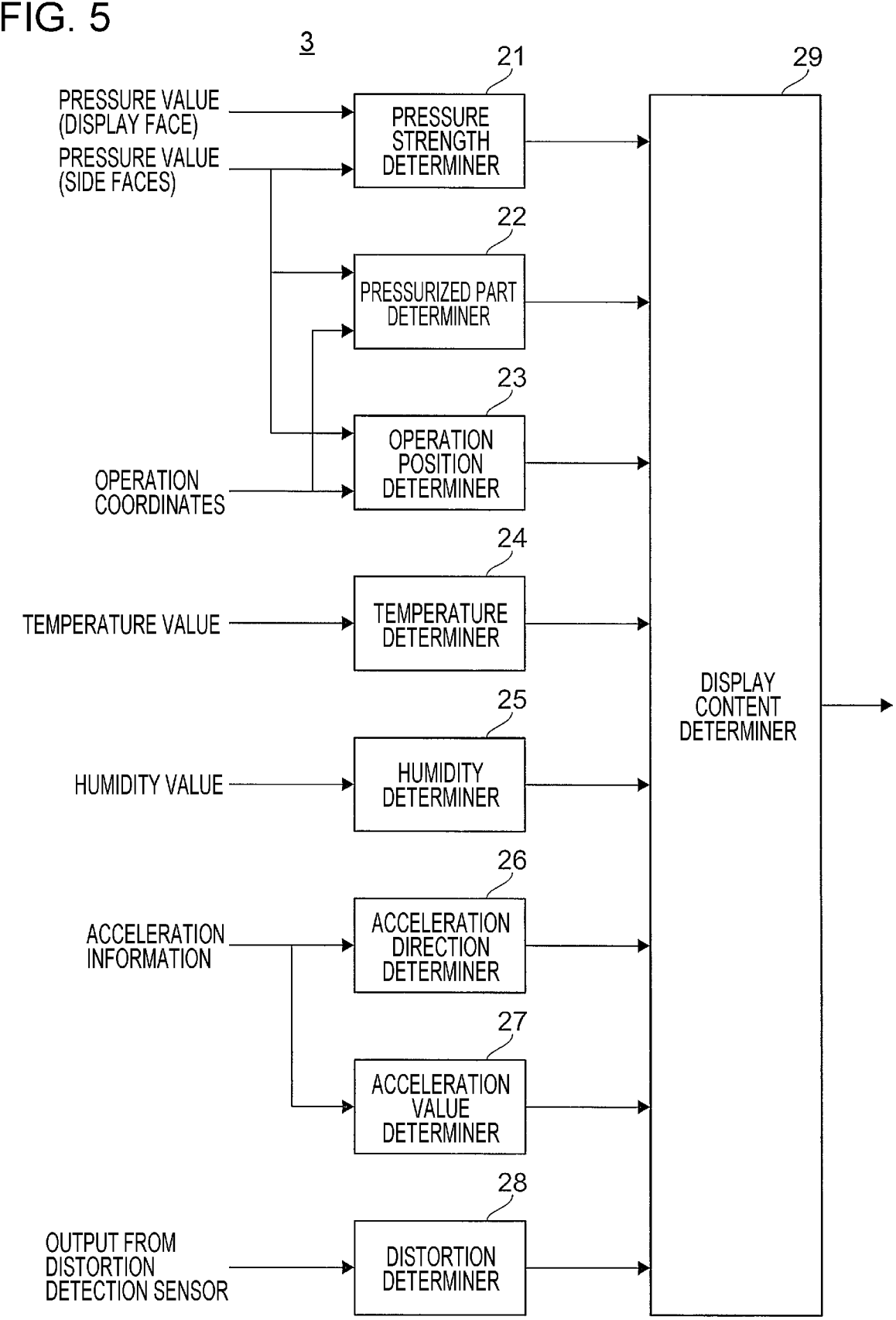
FIG. 5 illustrates a functional configuration example of a controller according to the first exemplary embodiment.

FIG. 5 illustrates a functional configuration example of the controller 3 according to the first exemplary embodiment.

The functional configuration illustrated in FIG. 5 is realized by a program being executed.

The controller 3 according to the first exemplary embodiment serves as a pressure strength determiner 21 that determines the strength of pressure, a pressurized part determiner 22 that determines the part to which pressure has been applied, an operation position determiner 23 that determines the position of an operation, a temperature determiner 24 that determines a temperature, a humidity determiner 25 that determines a humidity, an acceleration direction determiner 26 that determines the direction of acceleration, an acceleration value determiner 27 that determines the value of acceleration, a distortion determiner 28 that determines the direction and degree of distortion, and a display content determiner 29 that determines display content by using determined information.

The display content determiner 29 is an example of a display controller.

The pressure strength determiner 21 receives a pressure value that is output from the pressure detection sensor 5 provided on the front face side and pressure values that are output from the two pressure detection sensors 7A and 7B provided on the side face side and outputs the strengths of pressure applied to the respective positions from comparison with a threshold that is prepared in advance.

If pressure values are input from the pressure detection sensors 7A and 7B provided on the side face side, the pressurized part determiner 22 determines that the positions at which pressure is applied by a user operation are on the side faces. On the other hand, if operation coordinates are input from the position detection sensor 4, the pressurized part determiner 22 determines that the position at which pressure is applied by a user operation is on the front face. Although the pressurized part determiner 22 and the operation position determiner 23 are provided separately in this exemplary embodiment, the pressurized part determiner 22 may also serve as the operation position determiner 23.

If pressure values are input from the pressure detection sensors 7A and 7B provided on the side face side, the operation position determiner 23 determines that a user operates the side surfaces. If operation coordinates are input from the position detection sensor 4, the operation position determiner 23 determines that a user operates the position according to the operation coordinates. The operation position determiner 23 also determines, in addition to operation positions at respective times, a locus of the operation positions over time. The operation position determiner 23 according to this exemplary embodiment is capable of detecting plural operation positions at a time.

The temperature determiner 24 determines temperatures of the respective parts, a temperature distribution, a temporal change, and the like on the basis of temperature values that are input from the temperature detection sensors 9A, 9B, and 9C.

The humidity determiner 25 determines humidities of the respective parts, a humidity distribution, a temporal change, and the like on the basis of humidity values that are input from the humidity detection sensors 10A, 10B, and 10C.

The acceleration direction determiner 26 determines the direction of acceleration that has acted on the housing and a temporal change thereof on the basis of acceleration information that is input from the acceleration detection sensor 8.

The acceleration value determiner 27 determines the value of acceleration that has acted on the housing and a temporal change thereof on the basis of acceleration information that is input from the acceleration detection sensor 8.

The distortion determiner 28 determines the direction and degree of distortion generated in the housing on the basis of an output from the distortion detection sensor 6.

On the basis of information from the above-described determiners, the display content determiner 29 makes a change to an object that is displayed three-dimensionally on the display 2. Specific change contents will be specifically described later.

Note that the physical quantity as a detection target differs according to the type and arrangement of sensors provided in the housing.

In addition, all of the above-described sensors are not necessarily provided in the housing.

Display Control Example

Next, examples of a control operation performed by the display content determiner 29 according to the first exemplary embodiment by using inputs from sensors will be described.

Figure 6:
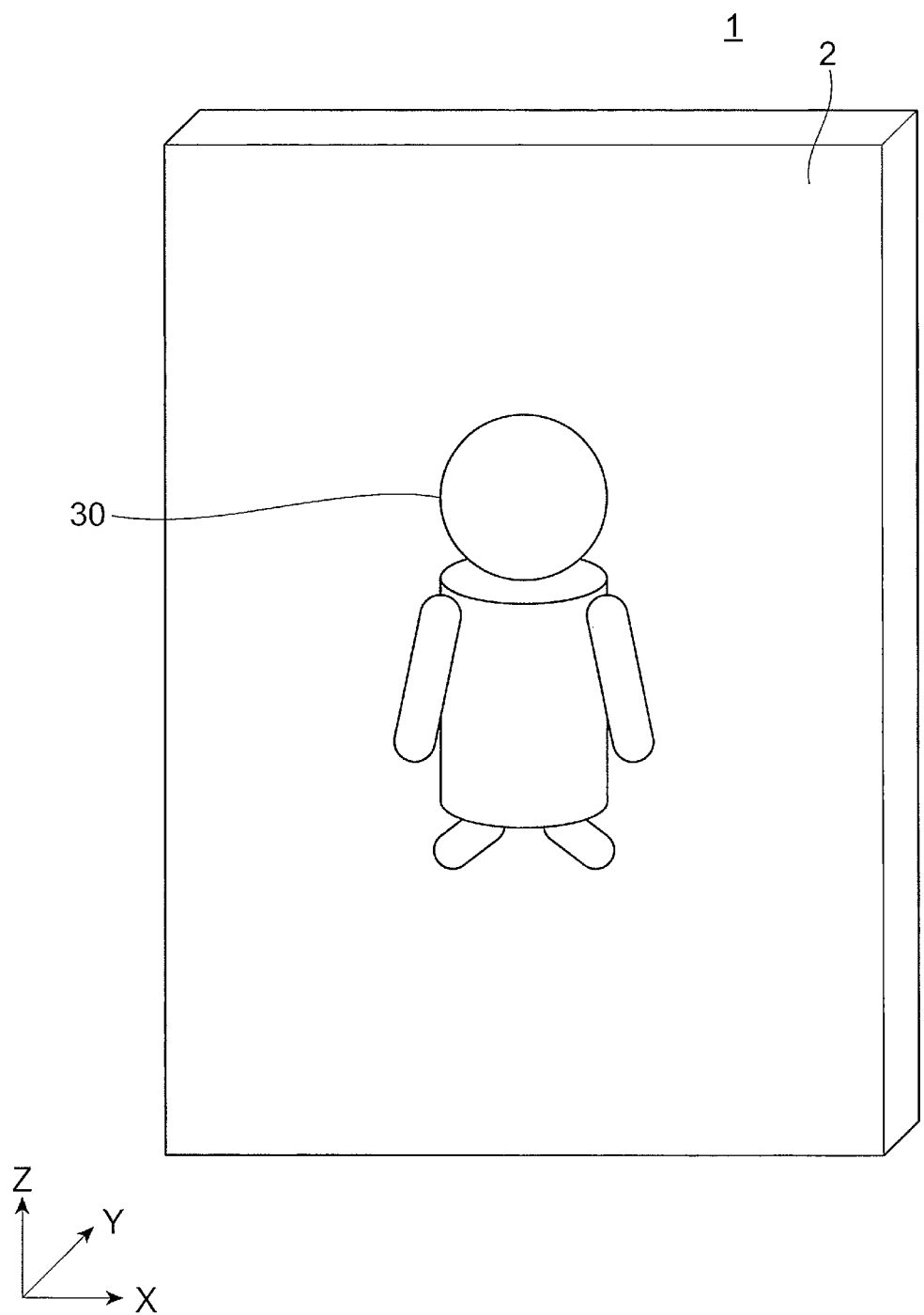
FIG. 6 illustrates an example of a three-dimensional object displayed on a display of the information processing apparatus.

FIG. 6 illustrates an example of a three-dimensional object displayed on the display 2 of the information processing apparatus 1.

The three-dimensional object illustrated in FIG. 6 represents a character 30 in the form of a person and is an example of an object that is displayed three-dimensionally.

Figure 7:
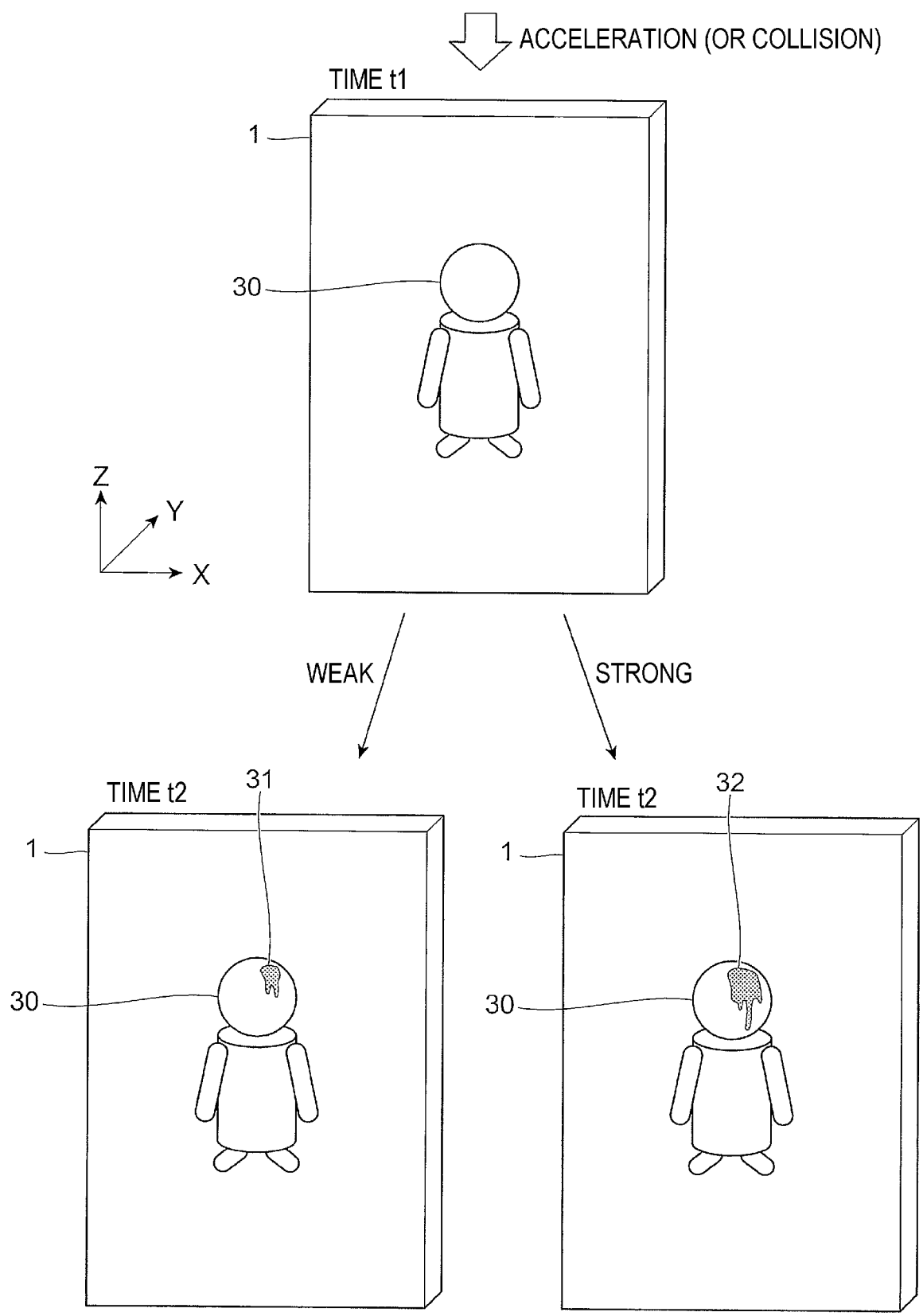
FIG. 7 illustrates changes that are made to a character displayed as the three-dimensional object upon acceleration (collision) being applied to a top face of the information processing apparatus.

FIG. 7 illustrates changes that are made to the character 30 displayed as the three-dimensional object upon acceleration (collision) being applied to the top face of the information processing apparatus 1. The acceleration (collision) is an example of a physical quantity by which, typically, a part is not directly determined.

The example illustrated in FIG. 7 is a case in which acceleration is applied downward (−Z direction) to the information processing apparatus 1 at time t1. This event is determined by the acceleration direction determiner 26 (see FIG. 5) if, for example, collision is applied to the top face of the information processing apparatus 1.

At this time, the display content determiner 29 (see FIG. 5) determines the part of the three-dimensional object on which the external force acts, on the basis of information regarding the determined acceleration direction.

In the example of FIG. 7, the head of the character 30 is positioned higher than any other portions. Thus, the display content determiner 29 determines that the external force acts on the head of the character 30.

Note that the acceleration value determiner 27 (see FIG. 5) also determines the value of acceleration at time t1. The acceleration value determiner 27 compares a numeric value that is received from the acceleration detection sensor 8 (see FIG. 4) with a threshold, and determines the strength of the external force that has acted on the information processing apparatus 1.

If the determined value of acceleration is small, the display content determiner 29 changes the display content at time t2 (t2>t1) in such a manner that a small amount of blood 31 flows from the head. The head is an example of a specific part. Note that the number of specific parts is not necessarily one and may be plural. In addition, the specific part is, in principle, a part of the three-dimensional object.

On the other hand, if the determined value of acceleration is large, the display content determiner 29 changes the display content at time t2 (t2>t1) in such a manner that a greater amount of blood 32 flows from the head than the amount of a case in which the value of acceleration is small.

Although the display content in the example of FIG. 7 is changed in such a manner that the head of the character 30 bleeds upon the detection of acceleration, a bruise (internal bleeding) may be displayed at the part on which the external force has acted. At this time, the area of the bruise may be changed in accordance with the strength of the external force that has acted.

Alternatively, a wen may be displayed at the part on which the external force has acted. At this time, the size of the wen may be changed in accordance with the strength of the external force that has acted.

Although the head of the character 30 is determined as an example of a part at a high position in the direction of acceleration that has acted on the information processing apparatus 1 in the example of FIG. 7, an arm of the character 30 may be determined as a part to which a change is to be made if the acceleration is in the left-right direction of the display 2.

In addition, although the character 30 in the form of a person is assumed as an example of the three-dimensional object in the example of FIG. 7, the three-dimensional object may be, for example, a structure. If the three-dimensional object is a structure, a change may be made in such a manner that a scratch or a crack is generated in accordance with the determined value of acceleration.

Figure 8:
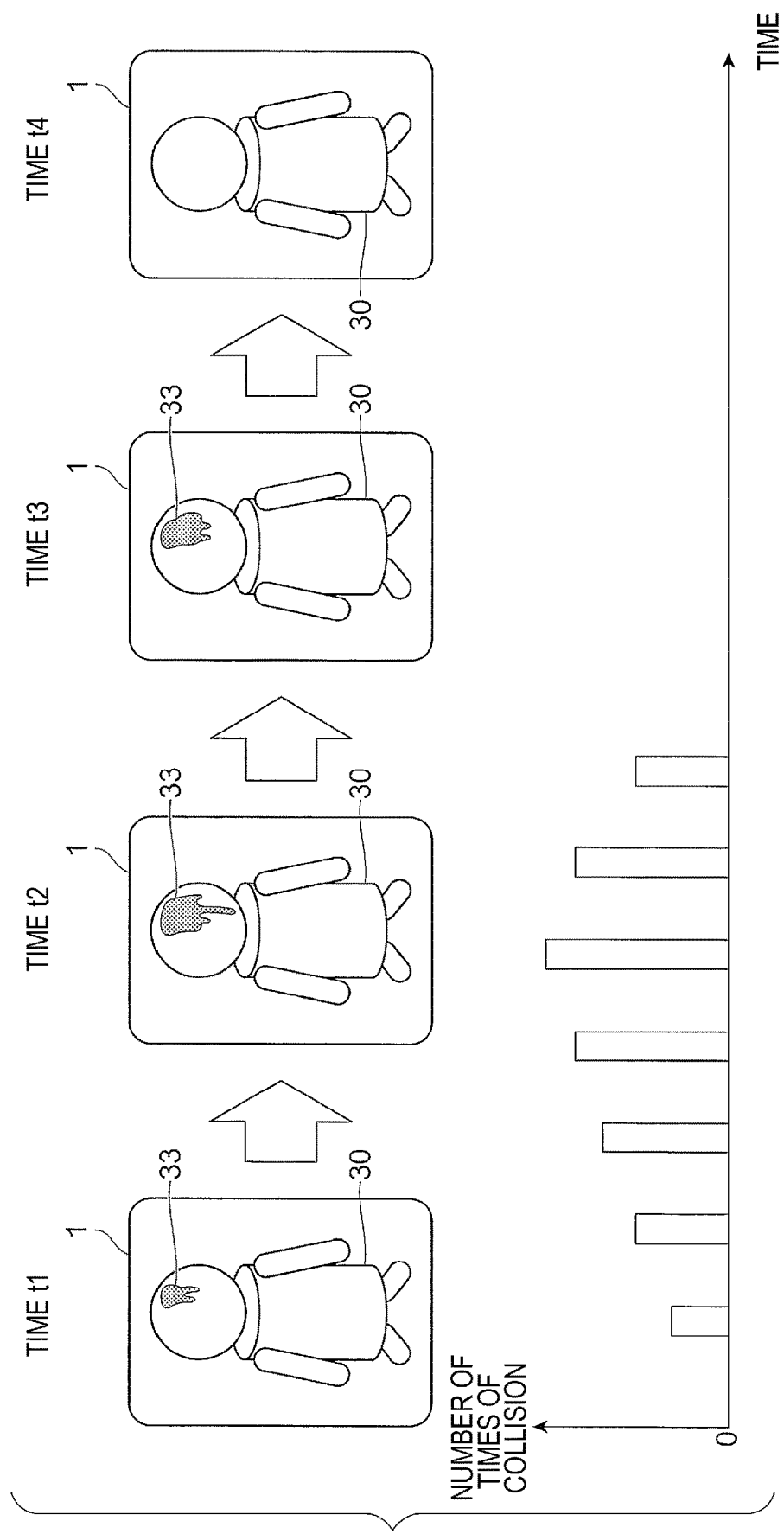
FIG. 8 illustrates changes that are made to the character displayed as the three-dimensional object if acceleration (collision) is continuously applied to the top face of the information processing apparatus.

FIG. 8 illustrates changes that are made to the character 30 displayed as the three-dimensional object if acceleration (collision) is continuously applied to the top face of the information processing apparatus 1.

As a method for continuously applying acceleration (collision), for example, the information processing apparatus 1 may tap another object, the information processing apparatus 1 may be tapped by another object, or the information processing apparatus 1 may be shaken while being held. In the example illustrated in FIG. 8, a case in which a user continuously taps an end face (top face) of the information processing apparatus 1 with a finger or the like is assumed.

Thus, the column chart illustrated in FIG. 8 has the horizontal axis representing time and the vertical axis representing the number of times of collision applied at respective times.

Note that, unlike in the example illustrated in FIG. 8, a part of the displayed image may be tapped with a fingertip to apply acceleration (collision) to a specific part. In this case, the position at which acceleration (collision) is applied is determined by the position detection sensor 4 (see FIG. 4). The value of acceleration is detected by the acceleration detection sensor 8 (see FIG. 4).

In the example of FIG. 8, the number of times of collision increases from time t1 to time t2, and then decreases. Although collisions do not necessarily have equal strength, typically, the total strength of collisions that act on the specific part is in proportion to the number of times of collision. However, the total strength of five collisions each having a collision strength of "2" equals to the total strength of two collisions each having a collision strength of "5".

Thus, in the example of FIG. 8, the area of flowing blood 33 increases from time t1 to time t2, and the area of the blood 33 flowing from the head of the character 30 decreases after time t2 from which the number of times of collision decreases (time t3) and disappears (time t4).

Note that the total strength is an example of a total of results of plural times of detection.

Figure 9:
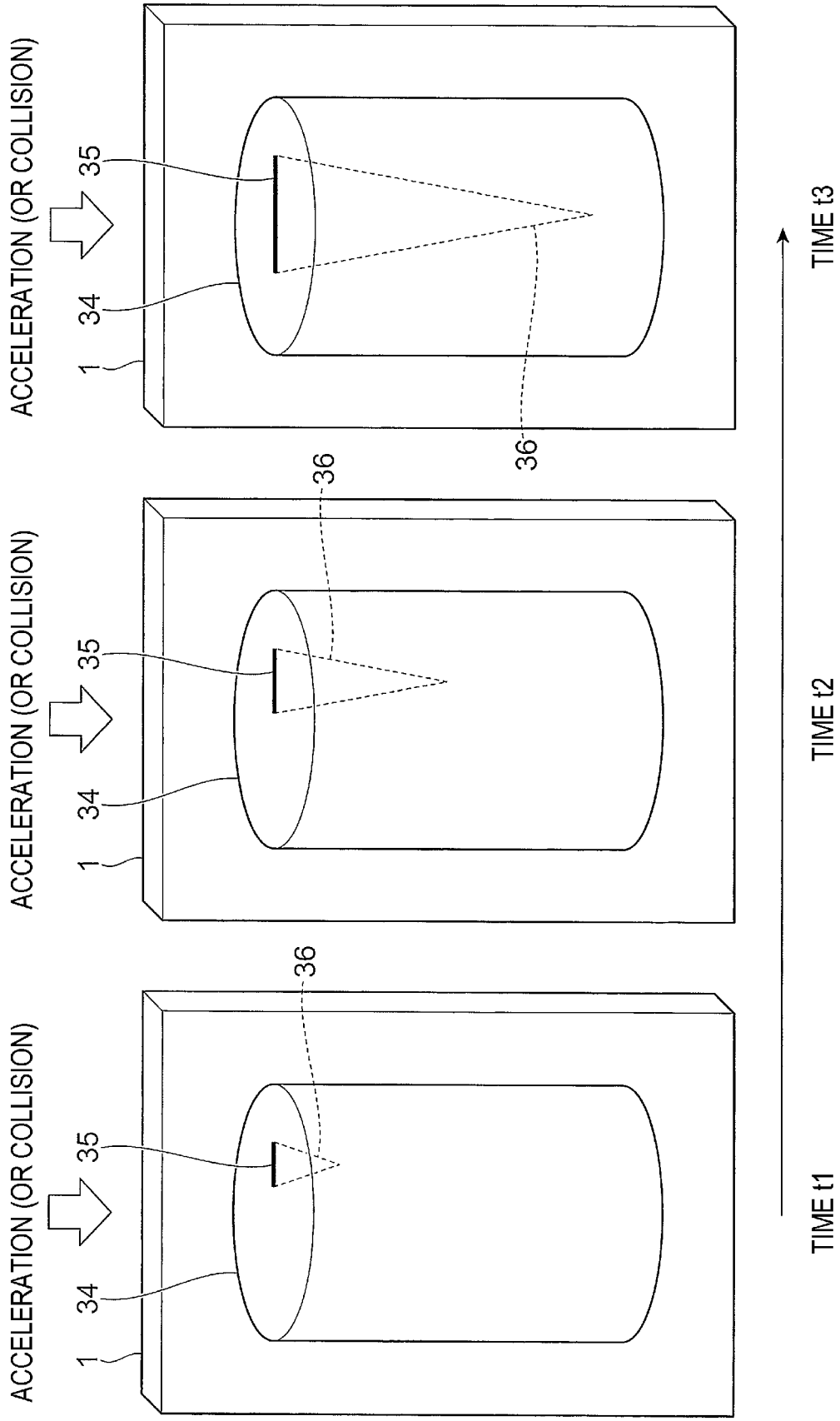
FIG. 9 illustrates changes that are made to a structure displayed as the three-dimensional object if acceleration (collision) is continuously applied to the top face of the information processing apparatus.

FIG. 9 illustrates changes that are made to a structure 34 displayed as the three-dimensional object if acceleration (collision) is continuously applied to the top face of the information processing apparatus 1.

FIG. 9 illustrates a case in which the structure 34 is a cylinder.

Also in the example illustrated in FIG. 9, acceleration is applied downward (−Z direction) to the information processing apparatus 1 at time t1. At this time, the display content on the information processing apparatus 1 is changed in such a manner that a scratch 35 is formed on the top face of the cylinder and a crack 36 grows inside the cylinder. Although the crack 36 generated inside is represented by a dashed line in FIG. 9 for illustration, only the scratch 35 observable from the outside may be displayed on the information processing apparatus 1.

In FIG. 9, acceleration (collision) is still applied to the top face of the information processing apparatus 1 at time t2 (t2>t1). The value of acceleration applied at time t2 may be equal to or different from the value of acceleration applied at time t1.

In the display at time t2, the width of the scratch 35 increases and the crack 36 grows in the depth direction compared with that in the display at time t1.

In addition, acceleration (collision) is still applied to the top face of the information processing apparatus 1 at time t3 (t3>t2). The value of acceleration applied at time t3 may be equal to or different from the value of acceleration applied at time t1 or t2.

In the display at time t3, the scratch 35 is wider and the crack 36 is deeper than those in the display at time t2.

Figure 10:
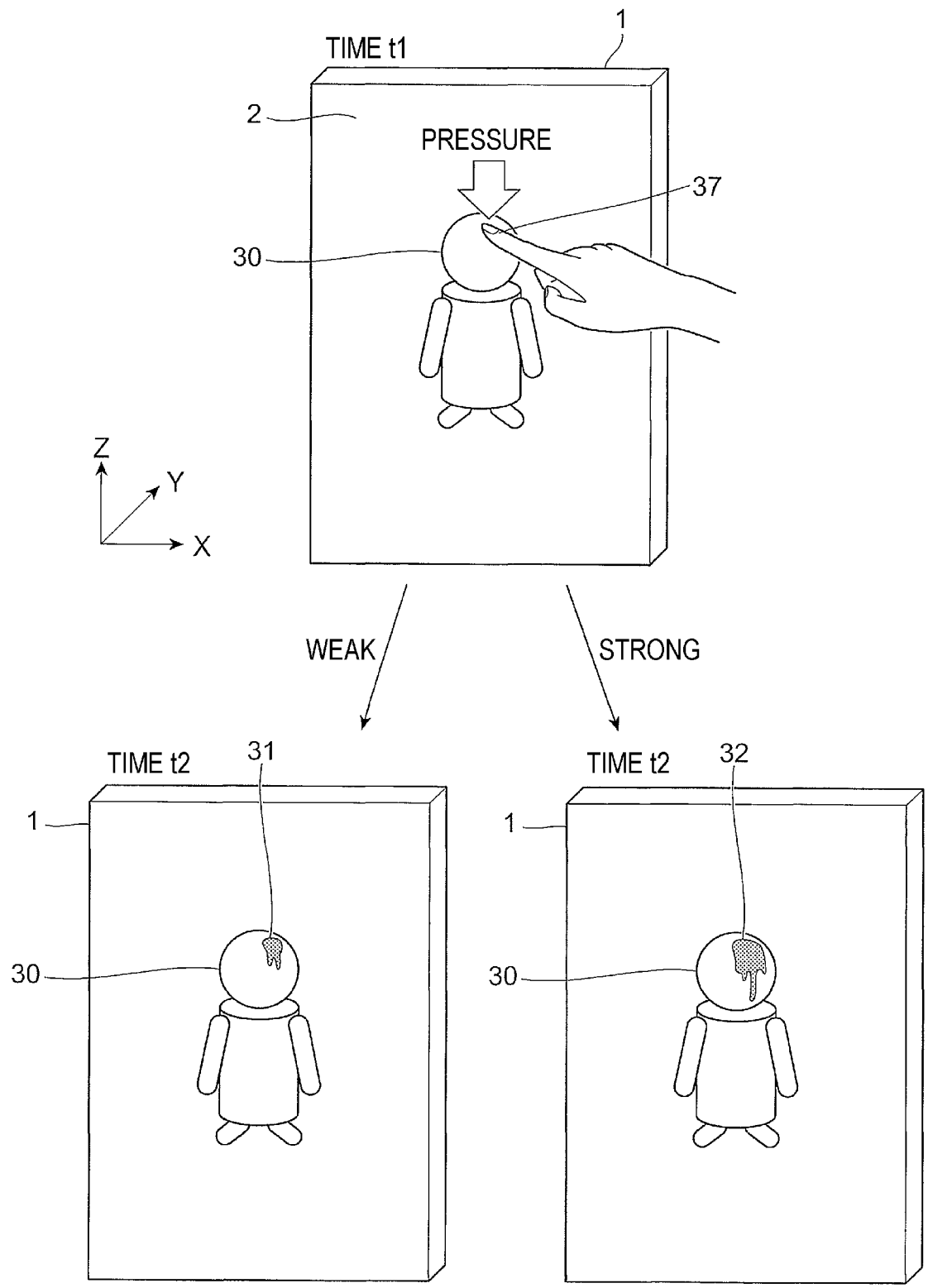
FIG. 10 illustrates changes that are made to the character displayed as the three-dimensional object upon pressure being applied to the head of the character.

FIG. 10 illustrates changes that are made to the character 30 displayed as the three-dimensional object upon pressure being applied to the head of the character 30.

In the example illustrated in FIG. 10, a case in which pressure is applied from the front face side of the information processing apparatus 1 toward the rear face side (Y direction) at time t1 is illustrated.

The position on which the pressure acts at this time is determined by the pressurized part determiner 22 (see FIG. 5) that receives an output signal from the position detection sensor 4 (see FIG. 4). This is because the position to which the pressure is applied is the same as the contact position of a fingertip 37.

The strength of pressure at this time is determined by the pressure strength determiner 21 (see FIG. 5) that receives an output signal from the pressure detection sensor 5 (see FIG. 4). The pressure strength determiner 21 compares the numerical value that is input from the pressure detection sensor 5 with a predetermined threshold to determine the strength of pressure that has acted on the information processing apparatus 1. The strength is determined in some levels.

If the determined strength of pressure is weak, the display content determiner 29 changes the display content at time t2 (t2>t1) in such a manner that a small amount of the blood 31 flows from the head.

On the other hand, if the determined strength of pressure is strong, the display content determiner 29 changes the display content at time t2 in such a manner that a greater amount of the blood 32 flows from the head than the amount of a case in which the strength of pressure is weak.

In this example, a user may directly determine the part to which a change is to be made in the display. In addition, in this example, a user may adjust the amount of change to be made to the specific part in accordance with the strength of pressure.

Although, in the display position of the character 30 displayed on the display 2 in FIG. 10, the position to which pressure is applied is determined by using the output from the pressure detection sensor 5, the part of the character 30 to which a change is to be made in the display may be determined by using the outputs from the pressure detection sensors 7A and 7B (see FIG. 3) that are prepared for detecting locally applied pressure.

For example, if pressure is detected by the pressure detection sensors 7A and 7B positioned in the lower portions of the left and right side faces of the information processing apparatus 1, in accordance with the strength of the detected pressure, as in FIG. 10, blood may flow from the head, or a change may be made to another part such as a hand, a leg, or the chest in the display.

If the output values from the pressure detection sensors 7A and 7B are used, the part to which a change is to be made may be set in the display content determiner 29 in advance.

Figure 11:
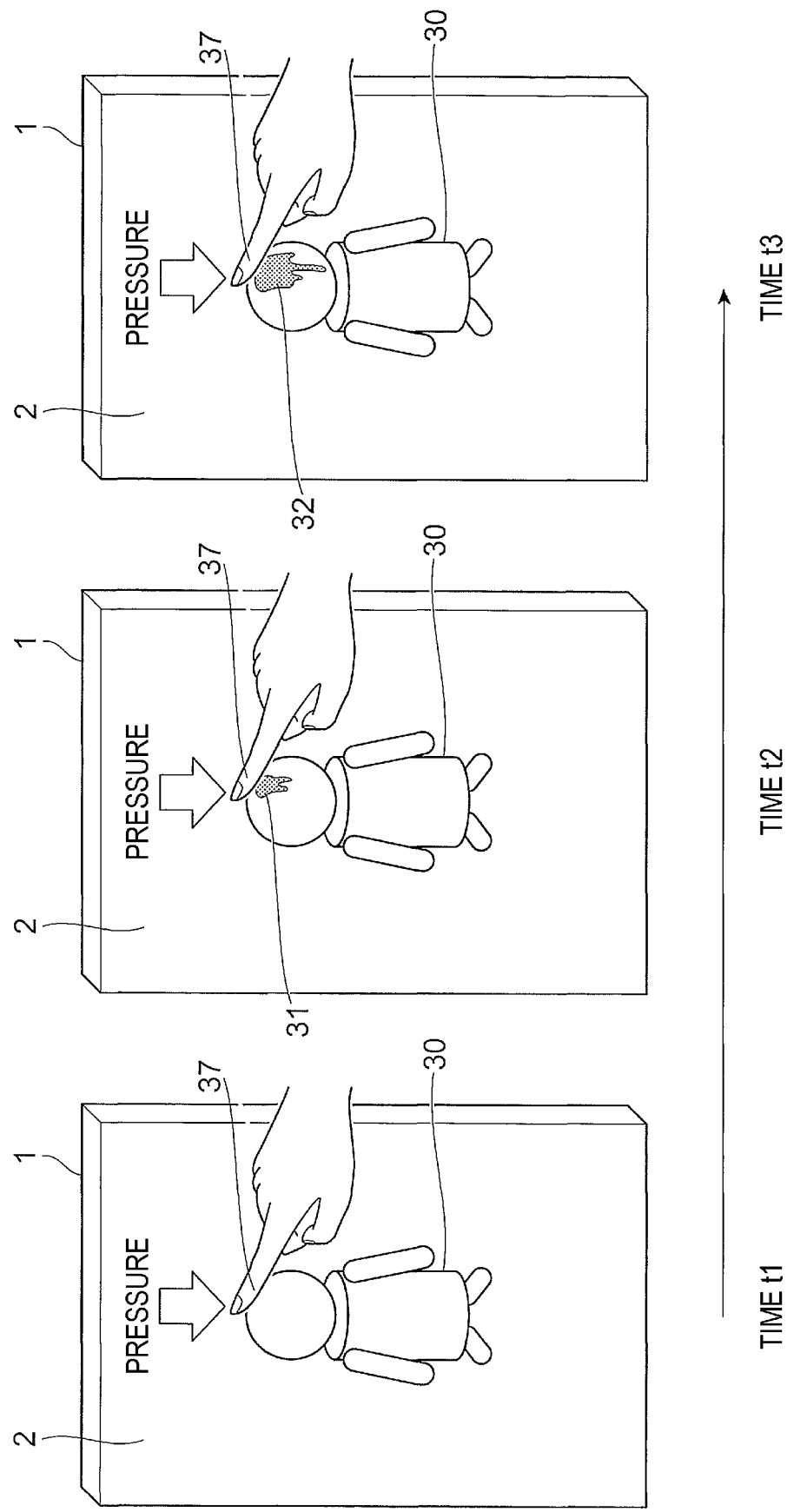
FIG. 11 illustrates changes that are made to the character displayed as the three-dimensional object if pressure is continuously applied by a fingertip to the head of the character.

FIG. 11 illustrates changes that are made to the character 30 displayed as the three-dimensional object if pressure is continuously applied by the fingertip 37 to the head of the character 30.

Needless to say, the pressure may be applied by an object other than a fingertip, such as a tip of a pen. In addition, the fingertip 37 does not have to be continuously in contact with the surface of the display 2 and may tap a specific part discontinuously as in the case in which acceleration (collision) is applied.

In the example illustrated in FIG. 11, the head of the character 30 remains pushed by the fingertip 37 from time t1 to time t3. In this case, the display content determiner 29 determines that the head keeps bleeding and adds an image of the blood 31 to the head at time t2 and increases the area of the blood 32 at time t3.

Here, the bleeding amount may be in proportion to the strength of pressure. For example, if the strength is strong, it may be determined that the bleeding amount is large; if the strength is weak, it may be determined that the bleeding amount is small. However, regardless of the strength of pressure, the bleeding amount may be increased and decreased in proportion to the length of time during which a pressure exceeding a predetermined threshold is applied.

Although the above-described example is a case in which a change made on a screen is bleeding or a scratch (crack) depending on a difference of the three-dimensional object displayed on the display 2, the change content may be different in accordance with the part on which an external force acts. Note that the change content may be any content as long as the specific part is displayed in a different form, such as addition, deletion, deformation, or division in the display.

Figure 12:
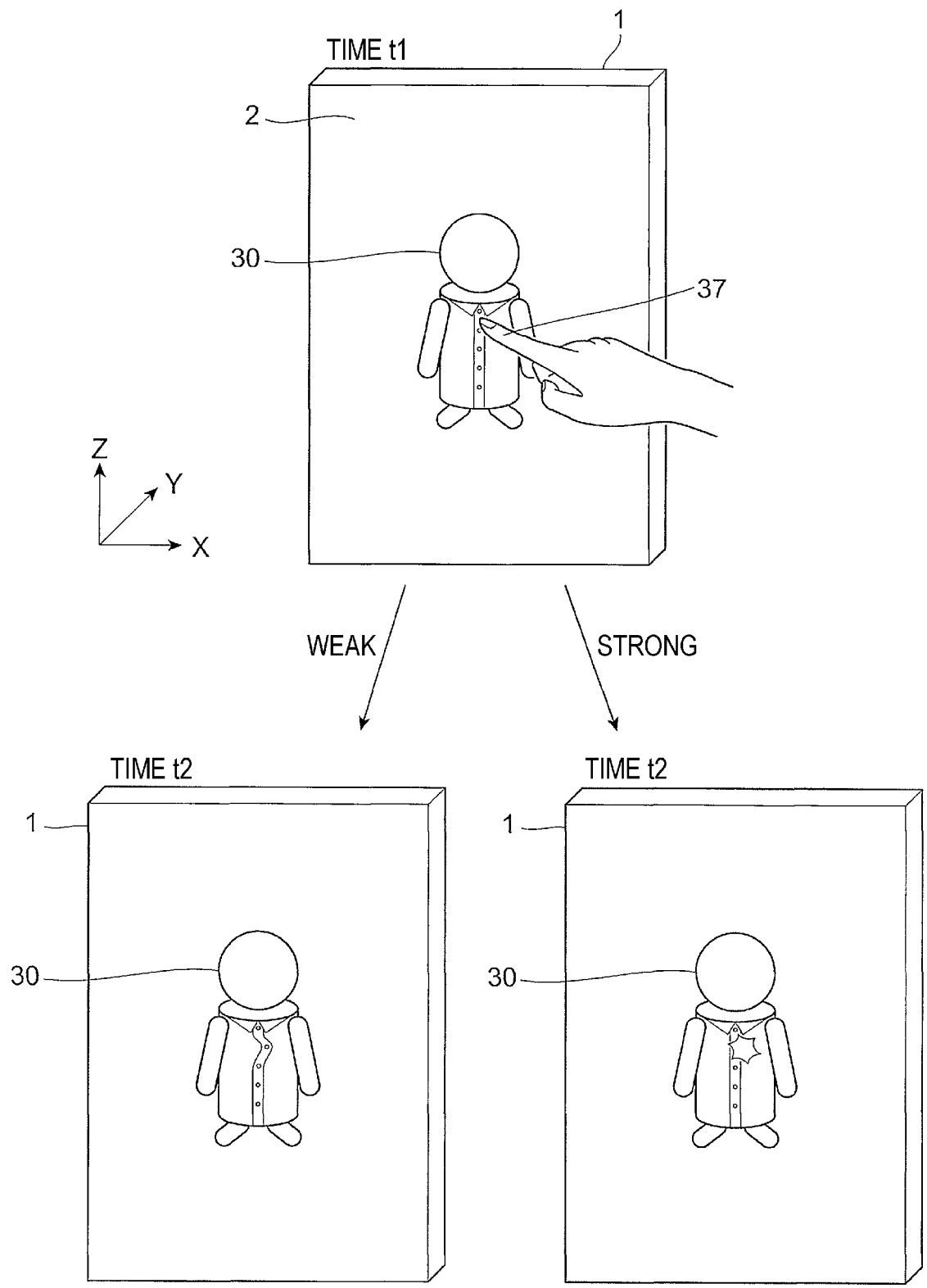
FIG. 12 illustrates changes that are made to the character displayed as the three-dimensional object upon pressure being applied to the chest of the character.

FIG. 12 illustrates changes that are made to the character 30 displayed as the three-dimensional object upon pressure being applied to the chest of the character 30.

In the example illustrated in FIG. 12, the chest, not the head, is pushed by the fingertip 37 at time t1. In this example, a change is made to clothing depending on a difference of the strength of pressure applied to the chest.

If the determined strength of pressure is weak, the display content determiner 29 changes the image into an image in which the clothing of the character 30 is lifted or strained at time t2 (t2>t1).

On the other hand, if the determined strength of pressure is strong, the display content determiner 29 changes the image into an image in which the clothing of the character 30 is ripped at time t2.

In addition, for example, the type of clothing may be changed or the clothing may be changed depending on the determined strength of pressure.

Figure 13:
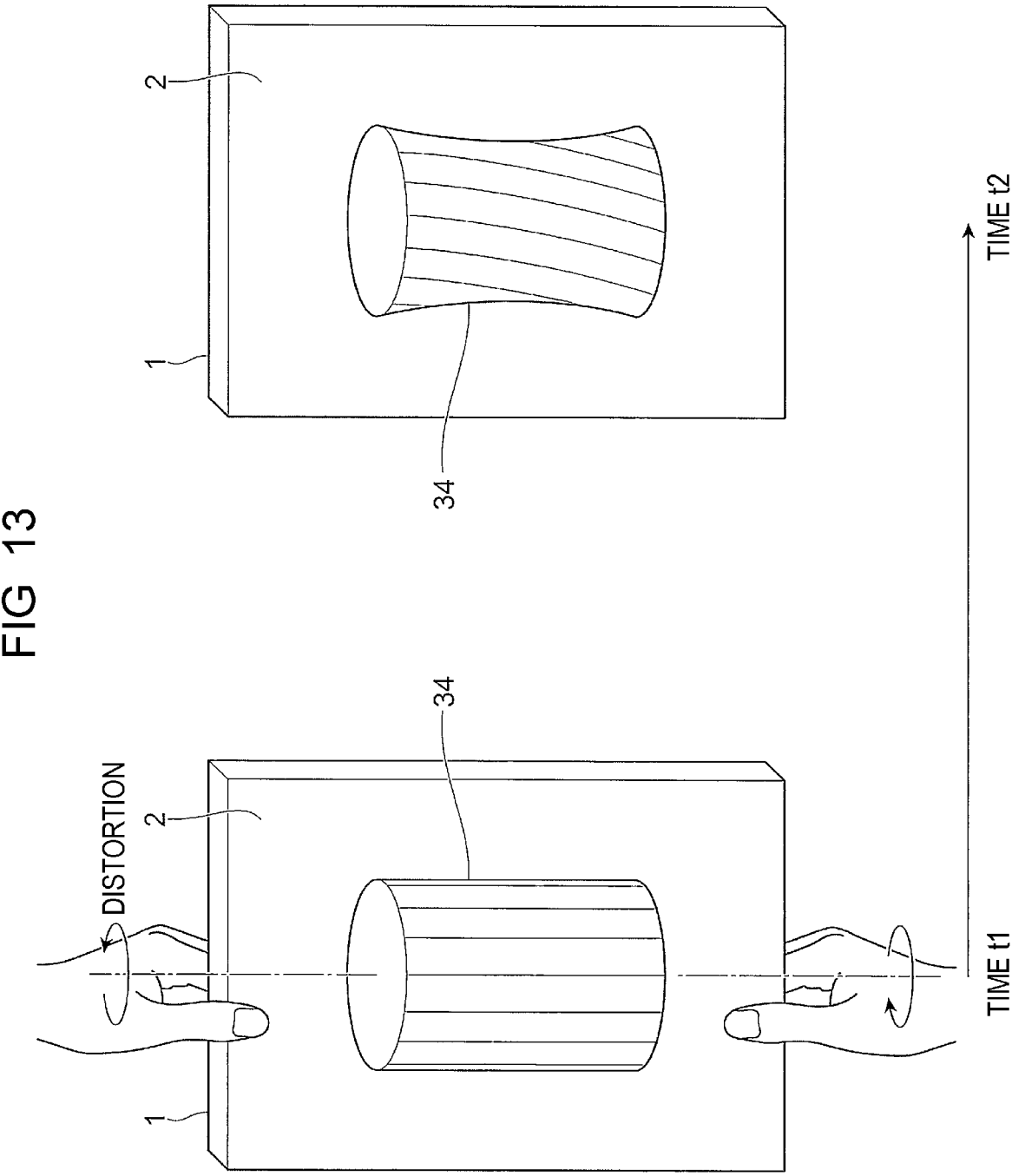
FIG. 13 illustrates changes that are made to the structure displayed as the three-dimensional object upon distortion being applied to the information processing apparatus.

FIG. 13 illustrates changes that are made to the structure 34 displayed as the three-dimensional object upon distortion being applied to the information processing apparatus 1.

FIG. 13 illustrates a cylinder as the structure 34. Stripes are provided on the outer circumferential face of the cylinder. The stripes are in parallel to the axial direction of the rotationally symmetric cylinder.

In the example illustrated in FIG. 13, while a counter-clockwise force acts on an upper portion of the information processing apparatus 1 in the form of a flat plate, a clockwise force acts on a lower portion of the information processing apparatus 1. That is, in FIG. 13, opposite forces act on the upper portion and the lower portion of the information processing apparatus 1.

At this time, the direction and degree of distortion acting on the information processing apparatus 1 are given from the distortion determiner 28 (see FIG. 5) to the display content determiner 29.

In accordance with the direction and degree of distortion determined at time t1, the display content determiner 29 generates an image in which the structure 34 is distorted and displays the image on the display 2.

In the example of FIG. 13, a change is made to the structure 34 at time t2 at which distortion is no longer applied, not at time t1 at which distortion is applied to the information processing apparatus 1. However, a change may be made to the displayed structure 34 at time t1 at which distortion is applied.

Although the change content works together with the distortion applied to the information processing apparatus 1 in the example of FIG. 13, another change may be made to the three-dimensional object, which is a display target, by using information on the determined direction and degree of distortion. For example, a character displayed on the display 2 may bleed or be scratched, or a change may be made to the clothing of the character.

Figure 14:
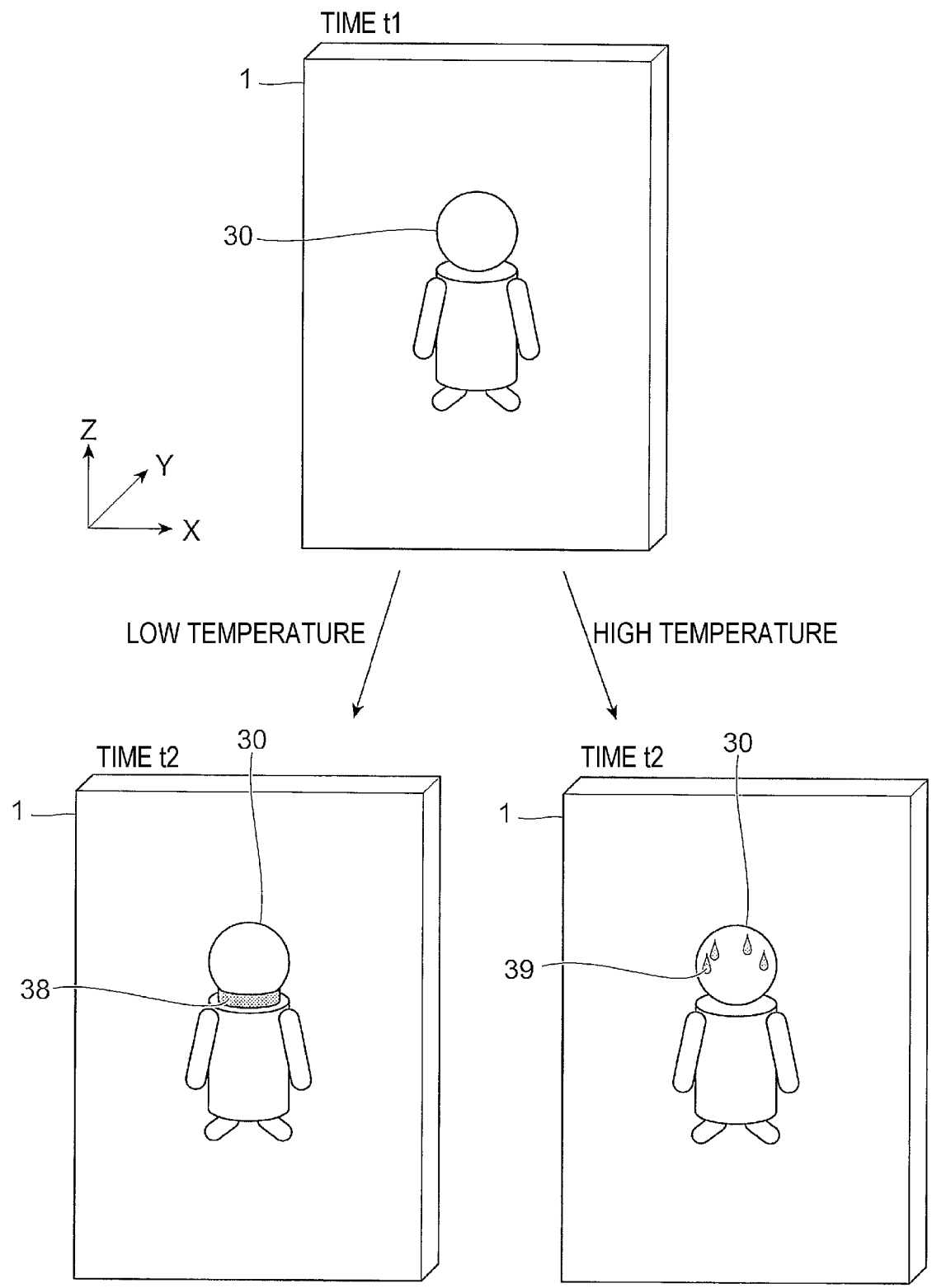
FIG. 14 illustrates changes that are made to the character displayed as the three-dimensional object upon a temperature change being detected by temperature detection sensors.

FIG. 14 illustrates changes that are made to the character 30 displayed as the three-dimensional object upon a temperature change being detected by the temperature detection sensors 9A, 9B, and 9C (see FIG. 3).

In this case, the display content determiner 29 makes a change to a specific part of the displayed character 30 on the basis of a result of comparison between a determined temperature and a predetermined threshold or information on the distribution of temperatures detected by the plural temperature detection sensors 9A, 9B, and 9C.

If, for example, the ambient temperature of the information processing apparatus 1 detected at time t1 is lower than a predetermined threshold, the display content determiner 29 changes the display content at time t2 into a state in which a scarf 38 is put around the neck of the character 30. The neck of the character 30 is an example of the specific part.

If, for example, the ambient temperature of the information processing apparatus 1 detected at time t1 is higher than a predetermined threshold, the display content determiner 29 changes the display content at time t2 into a state in which the forehead of the character 30 is covered with sweat 39. The forehead of the character 30 is an example of the specific part.

Figure 15:
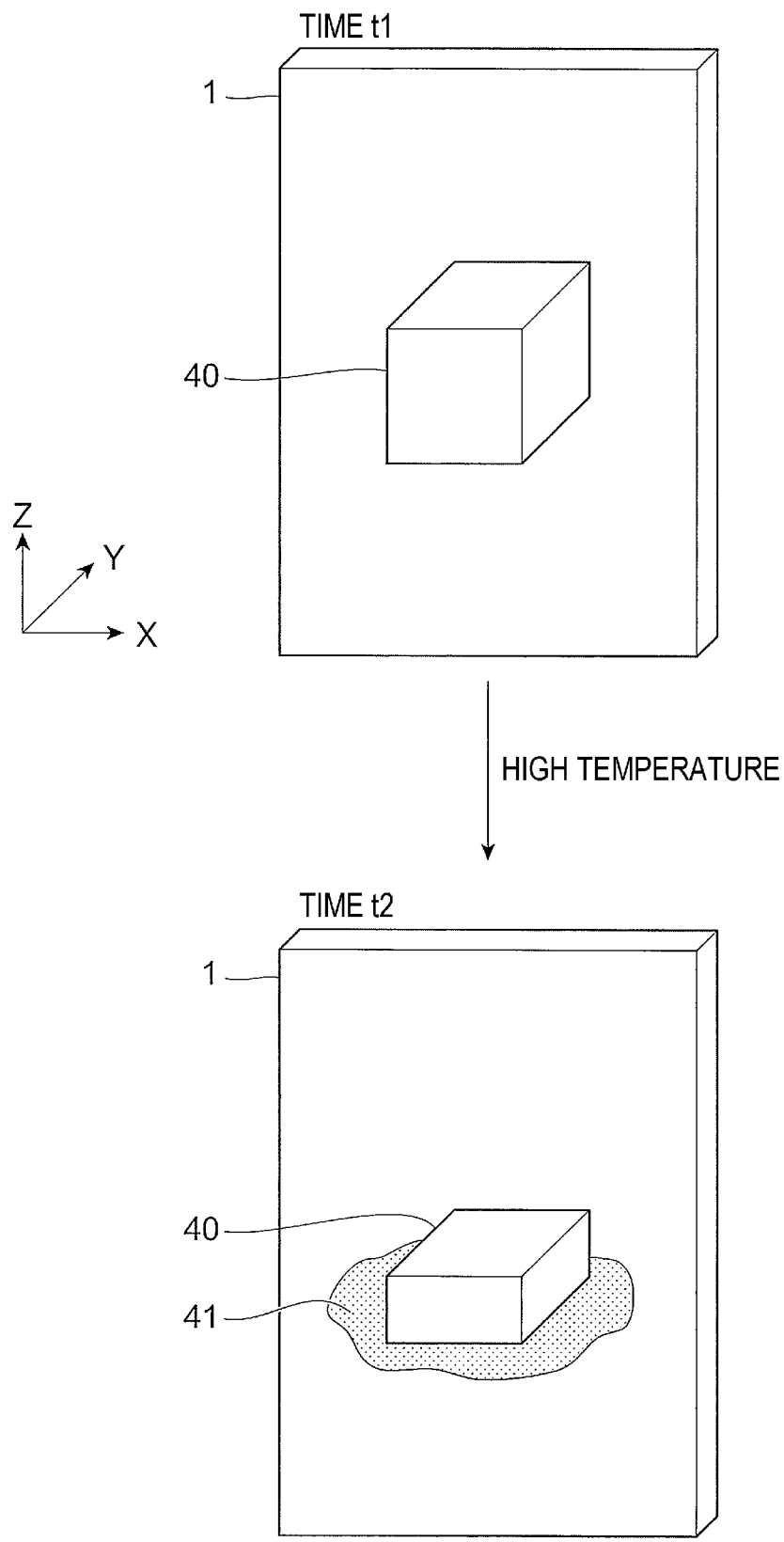
FIG. 15 illustrates a change that is made to an ice cube displayed as the three-dimensional object upon a temperature change being detected by the temperature detection sensors.

FIG. 15 illustrates a change that is made to an ice cube 40 displayed as the three-dimensional object upon a temperature change being detected by the temperature detection sensors 9A, 9B, and 9C (FIG. 3).

In this case, the display content determiner 29 makes a change to a specific part of the displayed ice cube 40 on the basis of a result of comparison between a determined temperature and a predetermined threshold or information on the distribution of temperatures detected by the plural temperature detection sensors 9A, 9B, and 9C.

The example of FIG. 15 is a case in which the ambient temperature of the information processing apparatus 1 is higher than the predetermined threshold. In this case, the display content determiner 29 makes a change to in such a manner that the displayed ice cube 40 melts to be smaller and water 41 is gathered around the ice cube 40. The ice cube 40 is an example of the specific part.

Figure 16:
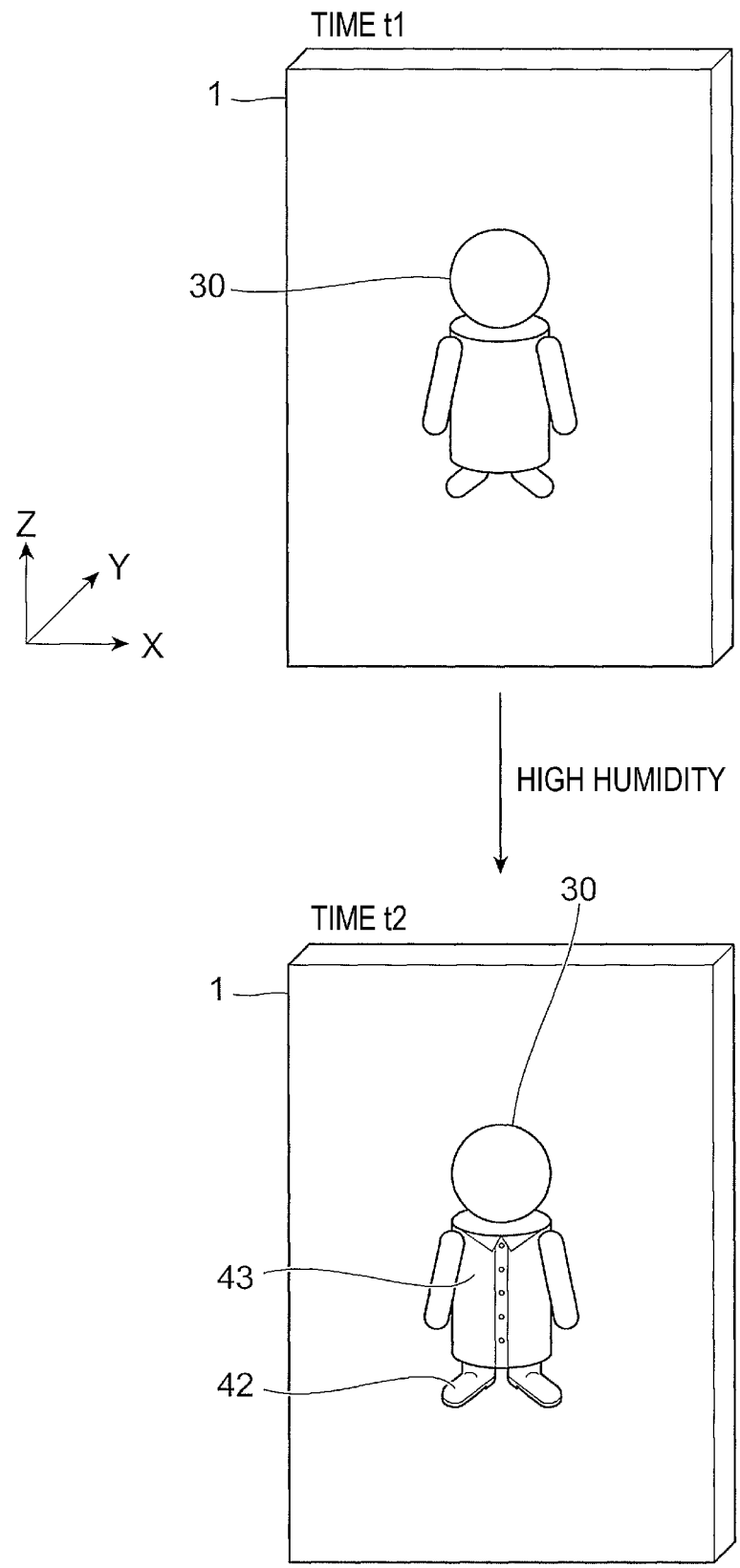
FIG. 16 illustrates a change that is made to the character displayed as the three-dimensional object upon a humidity change being detected by humidity detection sensors.

FIG. 16 illustrates a change that is made to the character 30 displayed as the three-dimensional object upon a humidity change being detected by the humidity detection sensors 10A, 10B, and 10C (see FIG. 3).

In this case, the display content determiner 29 makes a change to a specific part of the displayed character 30 on the basis of a result of comparison between a determined humidity and a predetermined threshold or information on the distribution of humidities detected by the plural humidity detection sensors 10A, 10B, and 10C.

The example of FIG. 16 is a case in which the ambient humidity of the information processing apparatus 1 is higher than the predetermined threshold. In this case, the display content determiner 29 changes the clothing and footwear of the character 30 into a raincoat 43 and rain boots 42.

The body and legs of the character 30 are each an example of the specific part. In addition, the clothing and footwear may be changed to the raincoat 43 and the rain boots 42 for rainy weather. Note that the clothing and footwear may be changed to those for waterside such as river or sea.

Other Configurations

Figure 17:
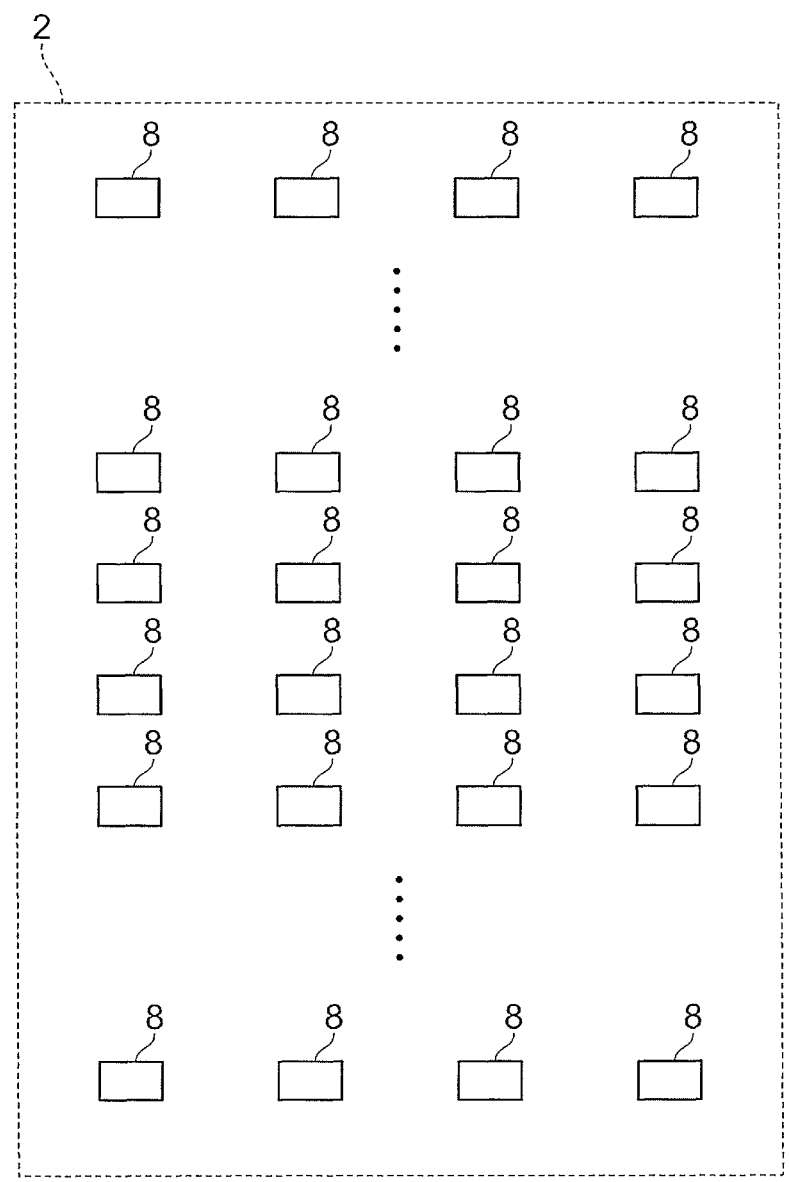
FIG. 17 illustrates an example in which acceleration detection sensors are arranged in M rows and N columns in the plane of the display.

Although the single acceleration detection sensor 8 detects the value of acceleration applied to the display 2 (see FIG. 1) in the first exemplary embodiment, plural acceleration detection sensors 8 may be provided in the plane of the display 2 as illustrated in FIG. 17.

FIG. 17 illustrates an example in which the acceleration detection sensors 8 are arranged in M rows and N columns in the plane of the display 2. In the case in which the acceleration detection sensors 8 are arranged as illustrated in FIG. 17, the distribution of values of local acceleration may be determined from positional information of the acceleration detection sensors 8.

Figure 18:
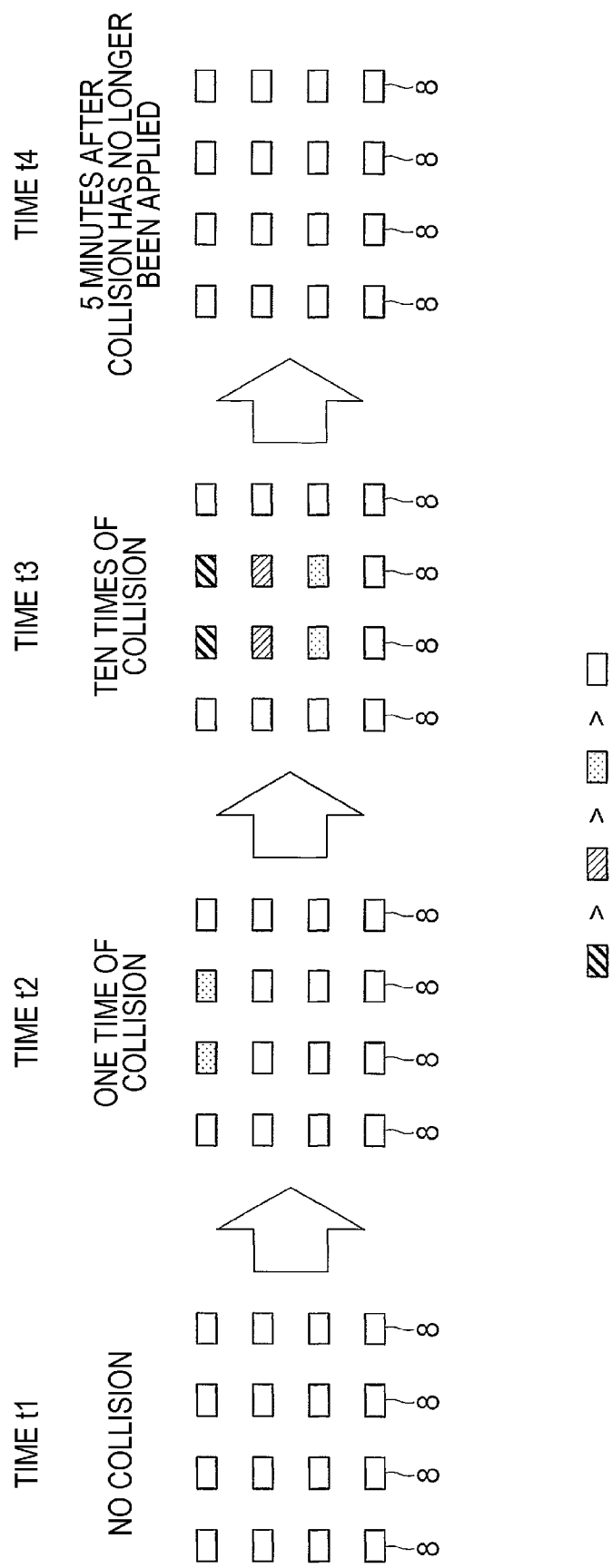
FIG. 18 illustrates a change in the number of times of detection of acceleration (collision) from a specific position in a case in which the acceleration detection sensors are arranged in 4 rows and 4 columns.

FIG. 18 illustrates a change in the number of times of detection of acceleration (collision) from a specific position in a case in which the acceleration detection sensors 8 are arranged in 4 rows and 4 columns.

In the case of FIG. 18, no collision is applied at time t1. At time t1, the number of times of detection is zero in each of the acceleration detection sensors 8. Collision is applied once to two acceleration detection sensors 8 positioned in the first row and the second and third columns at time t2. Collision is applied 10 times to the two acceleration detection sensors 8 positioned in the first row and the second and third columns at time t3, and propagation of vibrations in this process changes outputs from the acceleration detection sensors 8 in the second and third rows in the same columns. In the illustration of FIG. 18, darker shading of the acceleration detection sensors 8 indicates a larger total number of times of collision.

In the example at time t3, it is found that acceleration propagates from the first row to the second and third rows on the basis of the distribution of the number of times of collision detected by the plural acceleration detection sensors 8 within a predetermined period. Information on this propagation direction may be used to control content of a change to be made to the specific part.

At time t4, five minutes elapses after collision has no longer been applied. In this state, each number of times of detection of collision is reset to zero.

Note that substantially the same technique may be applied to the pressure detection sensor 5. The position detection sensor 4 and the pressure detection sensor 5 having substantially the same shape as the display 2 (see FIG. 2) are combined to detect the position and strength of pressure in the first exemplary embodiment. However, plural pressure detection sensors 5 may be arranged in the plane of the display 2, and positional information of the pressure detection sensors 5 that detect pressure may be used to calculate the position at which pressure is applied, the direction in which pressure as an external force is applied, the strength thereof, and the like.

In addition, a part to which a change is to be made in the display may be determined on the basis of the change and distribution of strengths of pressure detected by the respective pressure detection sensors 5.

In addition, the first exemplary embodiment has illustrated a case in which the three-dimensional object is displayed on the single display 2 (see FIG. 1) included in the information processing apparatus 1 (see FIG. 1). However, as illustrated in FIG. 19, substantially the same technique may be applied to processing of the controller 3 in an information processing apparatus 1A that displays an object three-dimensionally by displaying plural two-dimensional objects corresponding to a single object.

Figure 19:
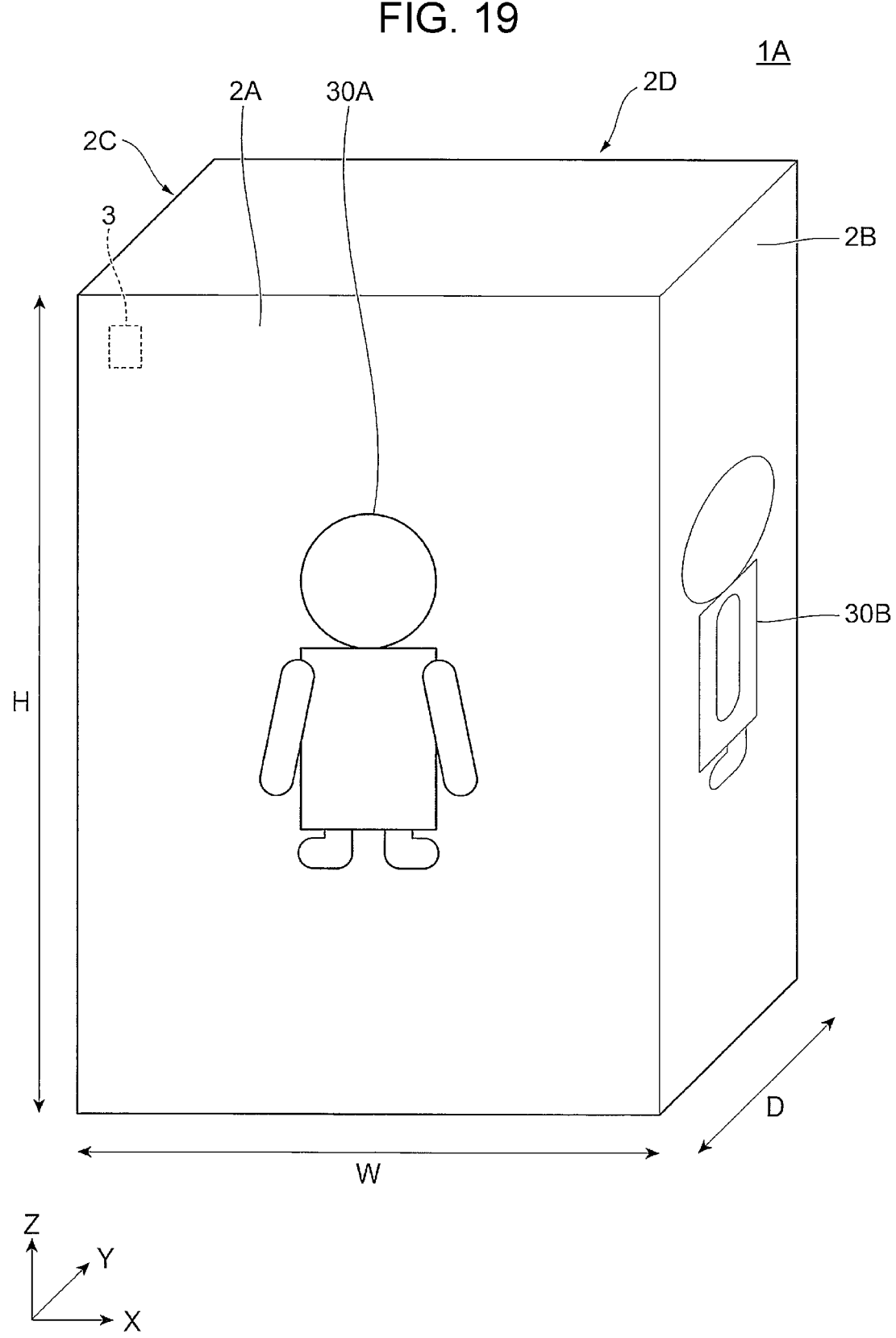
FIG. 19 illustrates an appearance example of an information processing apparatus including displays on four faces, which are a front face, side faces, and a back face.

FIG. 19 illustrates an appearance example of the information processing apparatus 1A including displays 2A to 2D on four faces, which are the front face, the side faces, and the back face.

In FIG. 19, a character front image 30A is displayed on the display 2A provided on the front face, a character right side image 30B is displayed on the display 2B provided on the right side face of the drawing, a character left side image is displayed on the display 2C provided on the left side face, and a character back image is displayed on the display 2D provided on the back face.

Note that the displays may be provided on two faces, such as the front and back faces or the top and bottom faces.

Also in a case of displaying an object three-dimensionally by arranging plural displays 2 three-dimensionally as in the above case, by making a change to a specific part of the displayed object on the basis of outputs from the sensors, it is possible to provide new representation to a user.

Second Exemplary Embodiment

Apparatus Configuration

Figure 20:
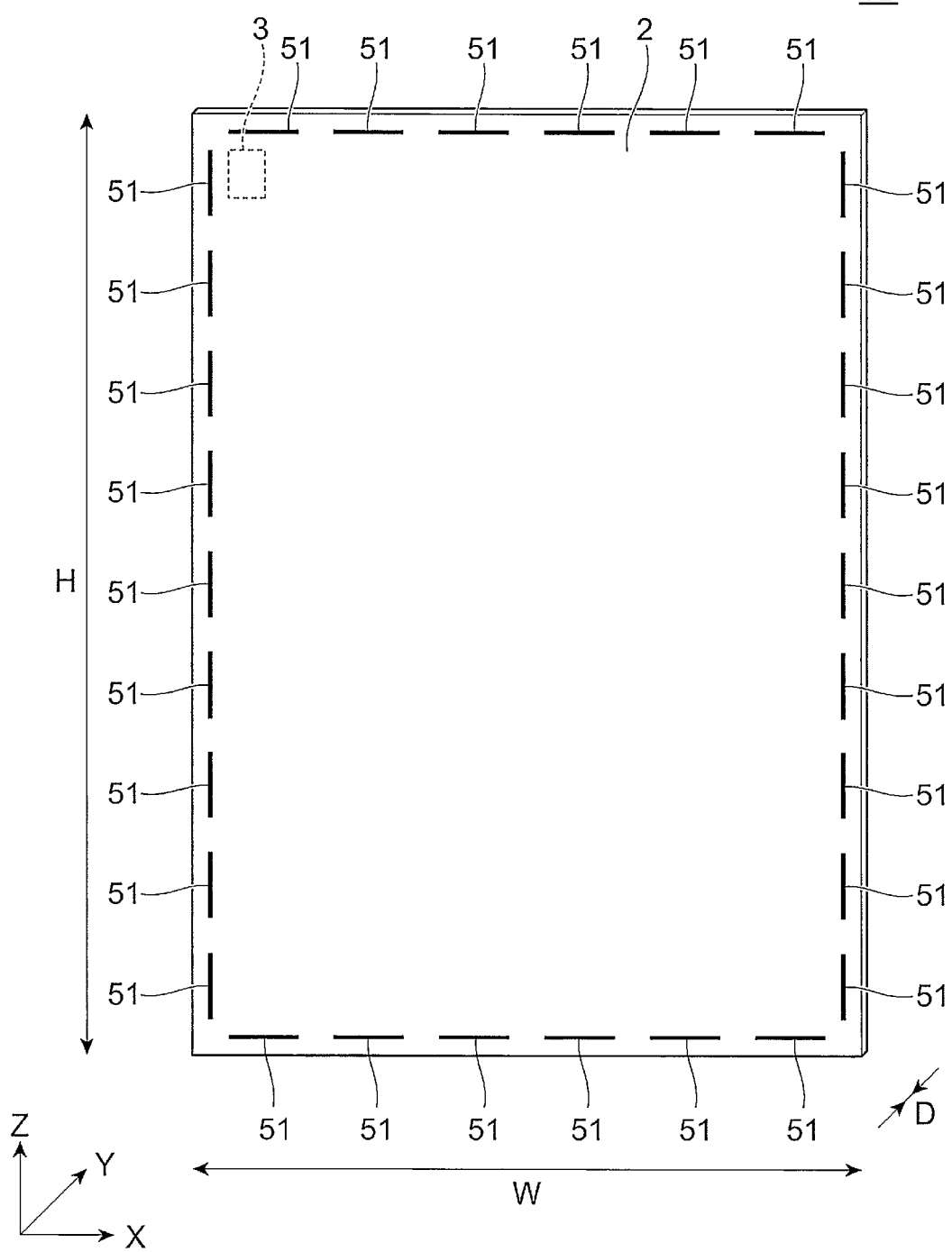
FIG. 20 illustrates an appearance example of an information processing apparatus according to a second exemplary embodiment.

FIG. 20 illustrates an appearance example of an information processing apparatus 1B according to a second exemplary embodiment.

In FIG. 20, parts corresponding to those in FIG. 1 are denoted by the corresponding reference numerals.

The appearance of the information processing apparatus 1B is substantially in the form of a plate as in the appearance of the information processing apparatus 1 according to the first exemplary embodiment.

However, the information processing apparatus 1B according to the second exemplary embodiment is different from the information processing apparatus 1 according to the first exemplary embodiment in that a housing is deformable at any position and in including deformation detection sensors 51 that detect the position where the housing is deformed.

The plural deformation detection sensors 51 are arranged along the outline of the housing. The arrangement positions and intervals (density) of the deformation detection sensors 51 are determined in accordance with the size or specifications of the deformation detection sensors 51. Note that the deformation detection sensors 51 may be arranged to overlap with the display 2.

Each of the deformation detection sensors 51 is configured from a so-called strain sensor, and, for example, a displacement sensor to which piezoelectricity of polylactic acid is applied, developed by Murata Manufacturing Co., Ltd., is used. The strain sensor outputs a sensor output whose level is in accordance with a bent amount (angle). Thus, the strain sensor is a device by which deformation of an attached member is detectable. Accordingly, the deformation detection sensors 51 also detect curving before bending as deformation.

Note that a state in which the housing of the information processing apparatus 1B is planar is referred to as a pre-deformation state or an initial state in the second exemplary embodiment.

On the basis of a positional relationship between the plural deformation detection sensors 51 that detect bending, the controller 3 estimates a bent position.

In this exemplary embodiment, the deformation detection sensors 51 are arranged on one face (e.g., a face on which the display is provided) of the housing. However, the deformation detection sensors 51 may be arranged on both faces of the housing.

The bent position is an example of a deformed position.

In the information processing apparatus 1B, a flexible housing formed of plastic or the like is provided with the display 2 used to display an image, the controller 3 that controls the entire apparatus, and the like. The information processing apparatus 1B that is specialized in displaying is referred to as a flexible display.

Figure 21:
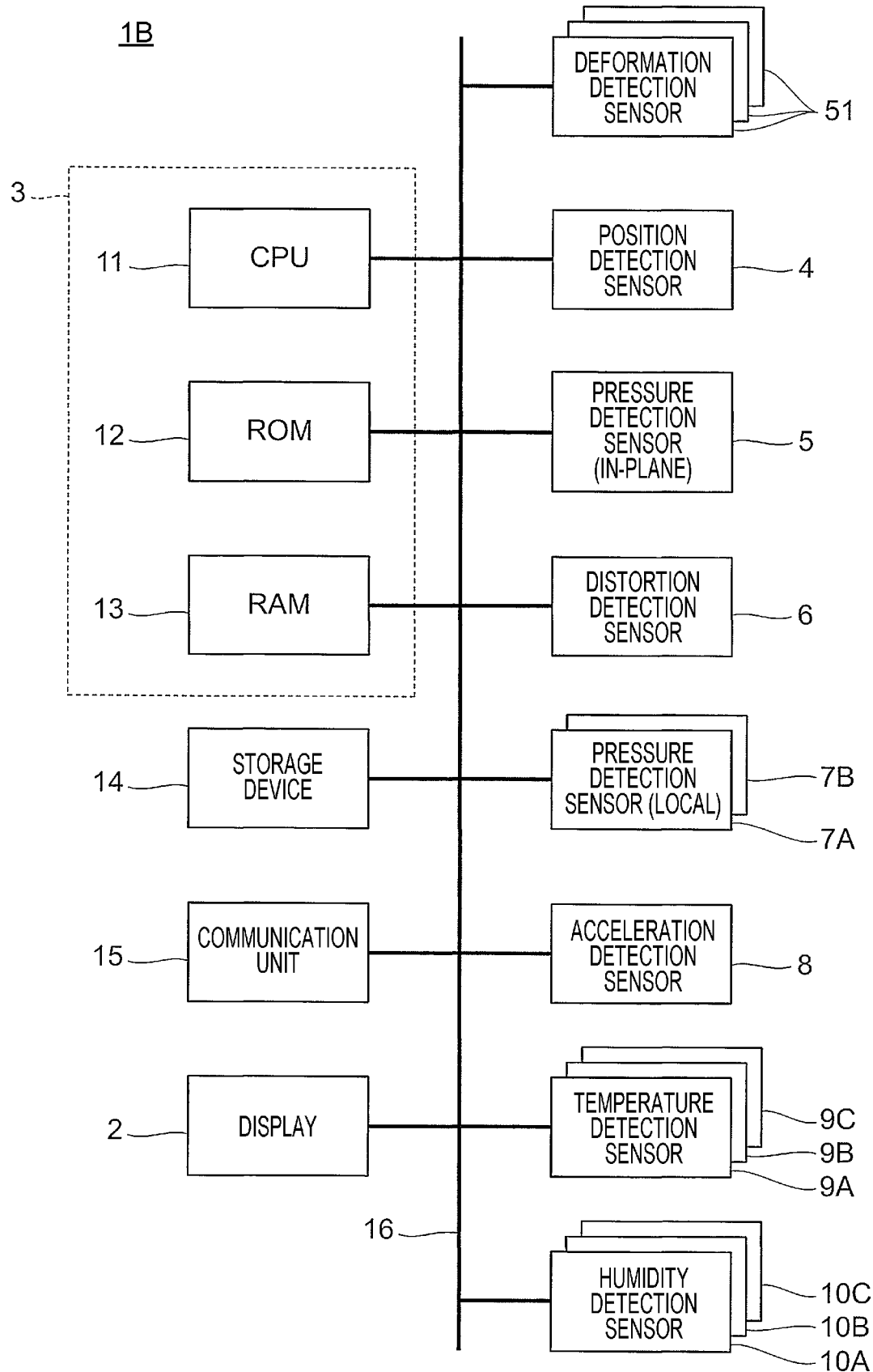
FIG. 21 illustrates a hardware configuration example of the information processing apparatus.

FIG. 21 illustrates a hardware configuration example of the information processing apparatus 1B.

In FIG. 21, parts corresponding to those in FIG. 4 are denoted by the corresponding reference numerals. The information processing apparatus 1B is different from the information processing apparatus 1 according to the first exemplary embodiment in that the plural deformation detection sensors 51 are connected to the bus 16.

Figure 22:
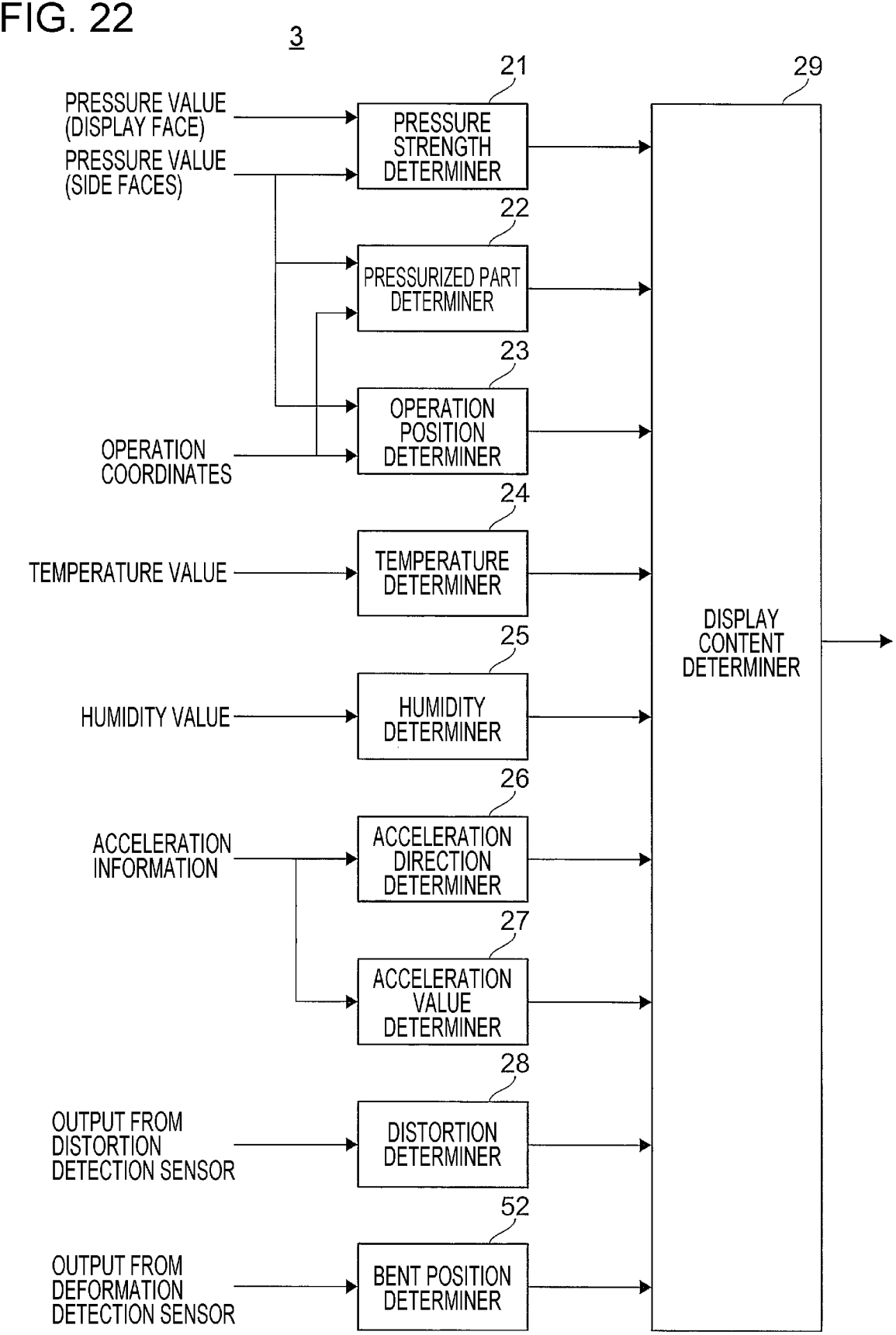
FIG. 22 illustrates a functional configuration example of a controller according to the second exemplary embodiment.

FIG. 22 illustrates a functional configuration example of the controller 3 according to the second exemplary embodiment.

In FIG. 22, parts corresponding to those in FIG. 5 are denoted by the corresponding reference numerals. The information processing apparatus 1B is different from the information processing apparatus 1 described in the first exemplary embodiment in including a bent position determiner 52 that receives outputs from the plural deformation detection sensors 51 and determines a bent position generated in the housing.

The display content determiner 29 according to this exemplary embodiment uses information on a bent position in the housing determined by the bent position determiner 52 to make a change to a specific part of an object that is displayed three-dimensionally or to make a change to display content.

FIGS. 23A to 23E illustrate examples of the bent position determined by the bent position determiner 52.

Figure 23A:
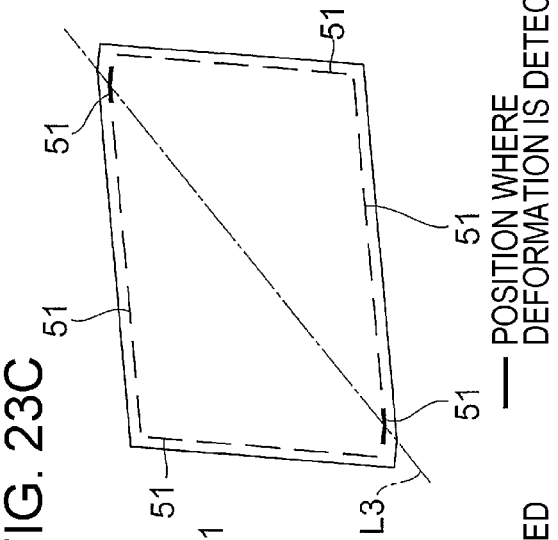
FIGS. 23A to 23E illustrate examples of a bent position determined by a bent position determiner.

FIG. 23A illustrates a bent position determined by the bent position determiner 52 if deformation is detected by two deformation detection sensors 51 each positioned near the midpoint of a short side of the information processing apparatus 1B. In the case of FIG. 23A, the bent position determiner 52 determines that the display 2 is bent in such a manner that a crease is put along a line L1 in parallel to long sides of the information processing apparatus 1B. Note that creases in FIGS. 23A to 23E are illustrated for description, and the creases are not necessarily put.

Figure 23B:
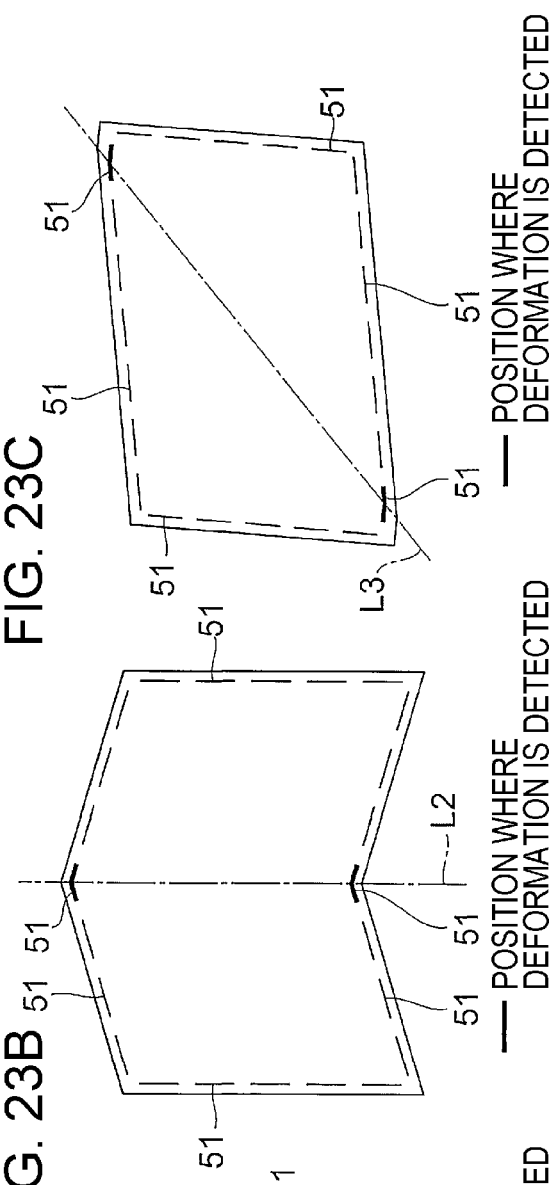

FIG. 23B illustrates a bent position determined by the bent position determiner 52 if deformation is detected by two deformation detection sensors 51 each positioned near the midpoint of a long side of the information processing apparatus 1B. In the case of FIG. 23B, the bent position determiner 52 determines that the display 2 is bent in such a manner that a crease is put along a line L2 in parallel to short sides of the information processing apparatus 1B.

Figure 23C:
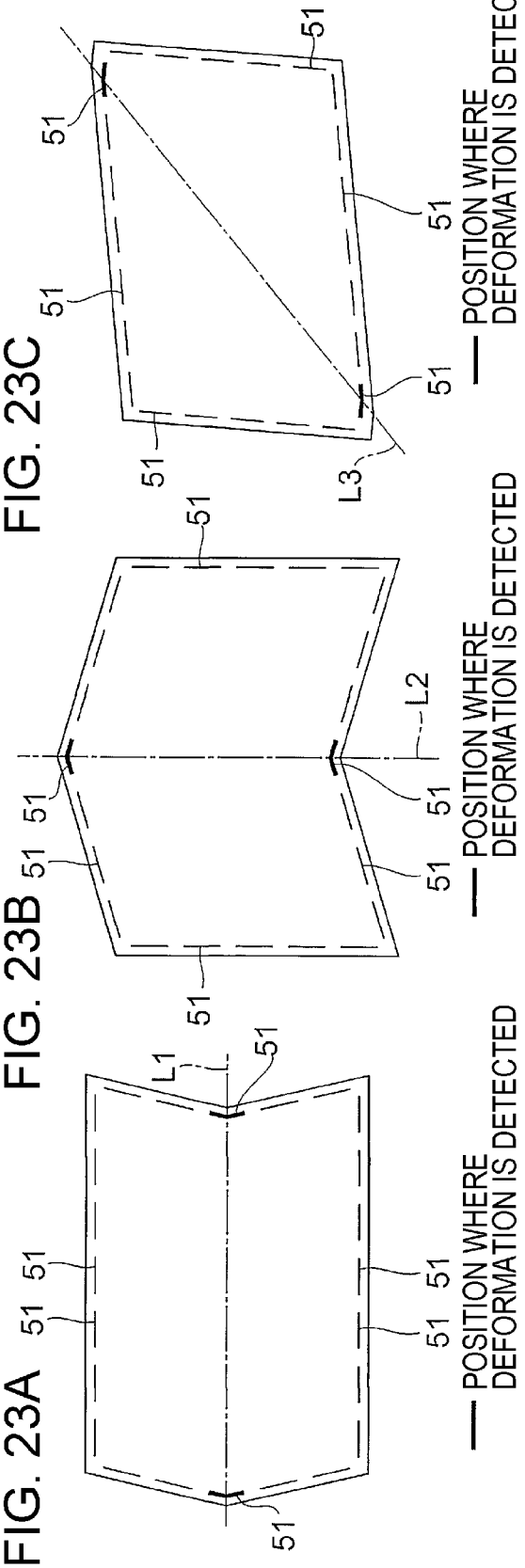

FIG. 23C illustrates a bent position determined by the bent position determiner 52 if deformation is detected by two deformation detection sensors 51 positioned at the upper right corner and the lower left corner of the information processing apparatus 1B. In the case of FIG. 23C, the bent position determiner 52 determines that the display 2 is bent in such a manner that a crease is put along a line L3 in a diagonal line to the upper right corner.

Figure 23D:
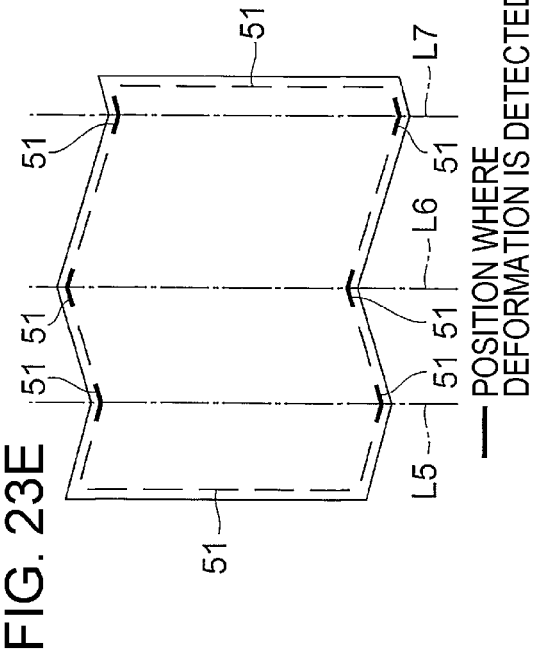

FIG. 23D illustrates a bent position determined by the bent position determiner 52 if deformation is detected by a deformation detection sensor 51 positioned at the upper right corner and a deformation detection sensor 51 positioned immediately below a deformation detection sensor 51 positioned at the upper left corner of the information processing apparatus 1B. In the case of FIG. 23D, the bent position determiner 52 determines that the display 2 is bent in such a manner that a crease is put along a line L4 that forms the hypotenuse of a right triangle whose right angle is at the upper left corner.

Figure 23E:
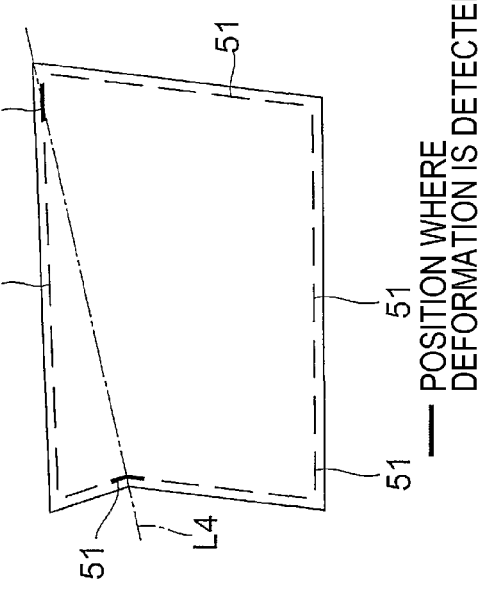

FIG. 23E illustrates a bent position determined by the bent position determiner 52 if deformation is detected by three deformation detection sensors 51 positioned in the upper side (long side) and three deformation detection sensors 51 positioned in the lower side (long side). In the case of FIG. 23E, the bent position determiner 52 determines that the display 2 is deformed in such a manner that creases are put along a line L5 in a valley fold, a line L6 in a mountain fold, and a line L7 in a valley fold from the left side to the right side.

Display Control Example

Next, examples of a control operation performed by the display content determiner 29 according to the second exemplary embodiment by using inputs from sensors will be described.

Figure 24:
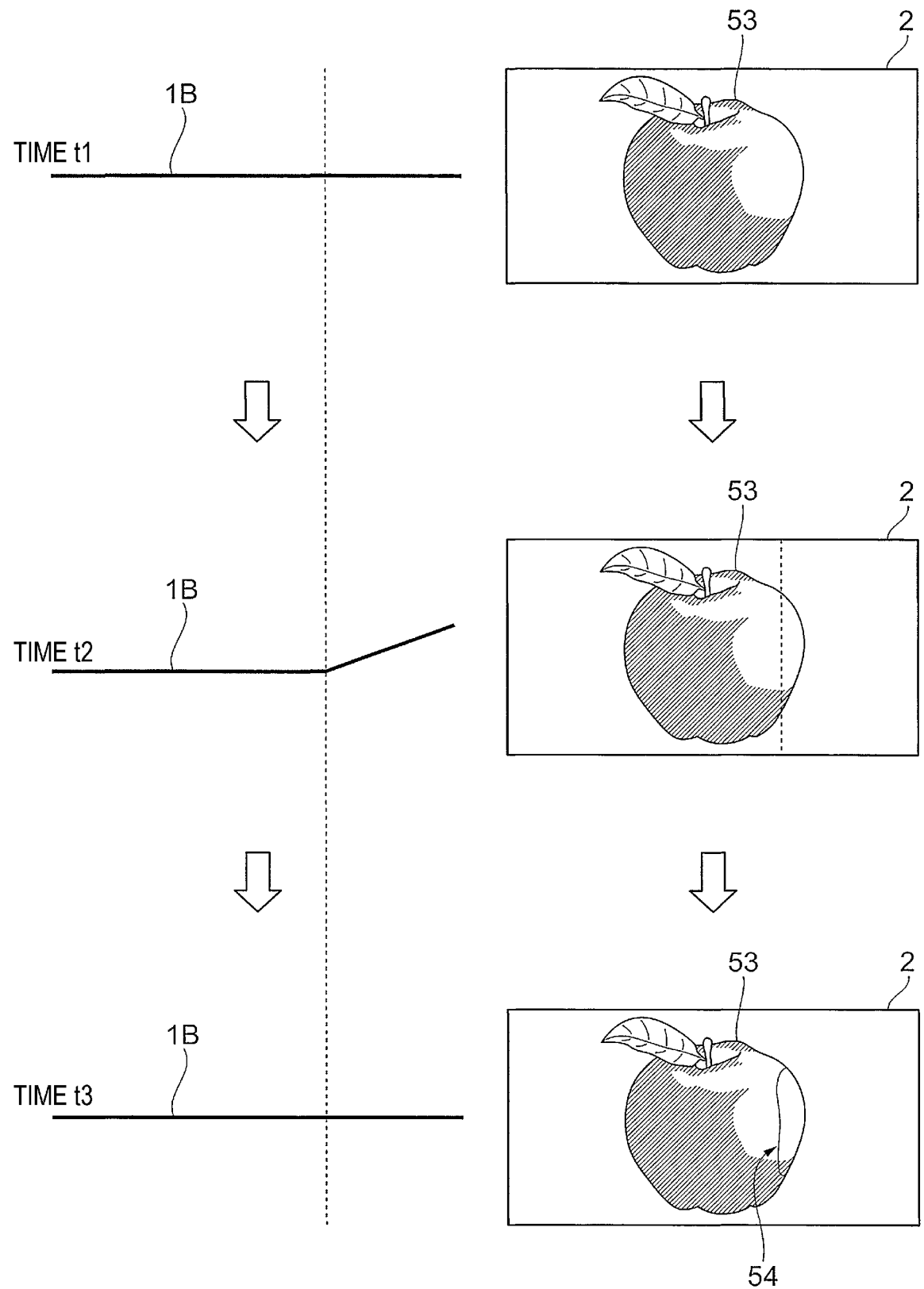
FIG. 24 illustrates an example in which an image of the three-dimensional object is edited by using information on the determined bent position.

FIG. 24 illustrates an example in which an image of the three-dimensional object is edited by using information on the determined bent position.

In FIG. 24, at time t1 before the information processing apparatus 1B is deformed, a three-dimensional image 53 of the three-dimensional object is displayed on the display 2. The three-dimensional image 53 in this case is an apple. In addition, the shape of the information processing apparatus 1B at time t1 is an example of a first shape.

At the next time, time t2, the information processing apparatus 1B is bent at a relatively right position with respect to the center of the screen in such a manner that the display 2 comes inside. Also at this time, no change is made to the displayed three-dimensional image 53 of the three-dimensional object. The shape of the information processing apparatus 1B at time t2 is an example of a second shape.

At the next time, time t3, the information processing apparatus 1B is made flat again, but a line 54 is added to the three-dimensional image 53 of the three-dimensional object at a part corresponding to the bent position at time t2 (curved part on the surface of the apple). In other words, the line addition is an example of editing on the three-dimensional image 53 (e.g., image itself) of the three-dimensional object displayed across the bent position.

In the case of FIG. 24, a user operation for bending the information processing apparatus 1B is used for the display content determiner 29 to add the line 54. Although the line 54 is started to be displayed after the information processing apparatus 1B has been made flat again (at and after time t3) in the example of FIG. 24, the line 54 may be started to be displayed while the information processing apparatus 1B is bent (at time t2). In this case, the displaying of the line 54 may end when the information processing apparatus 1B is no longer bent.

Here, the part at which a dashed line corresponding to the bent position crosses the three-dimensional image 53 of the three-dimensional object corresponds to a specific part.

Figure 25:
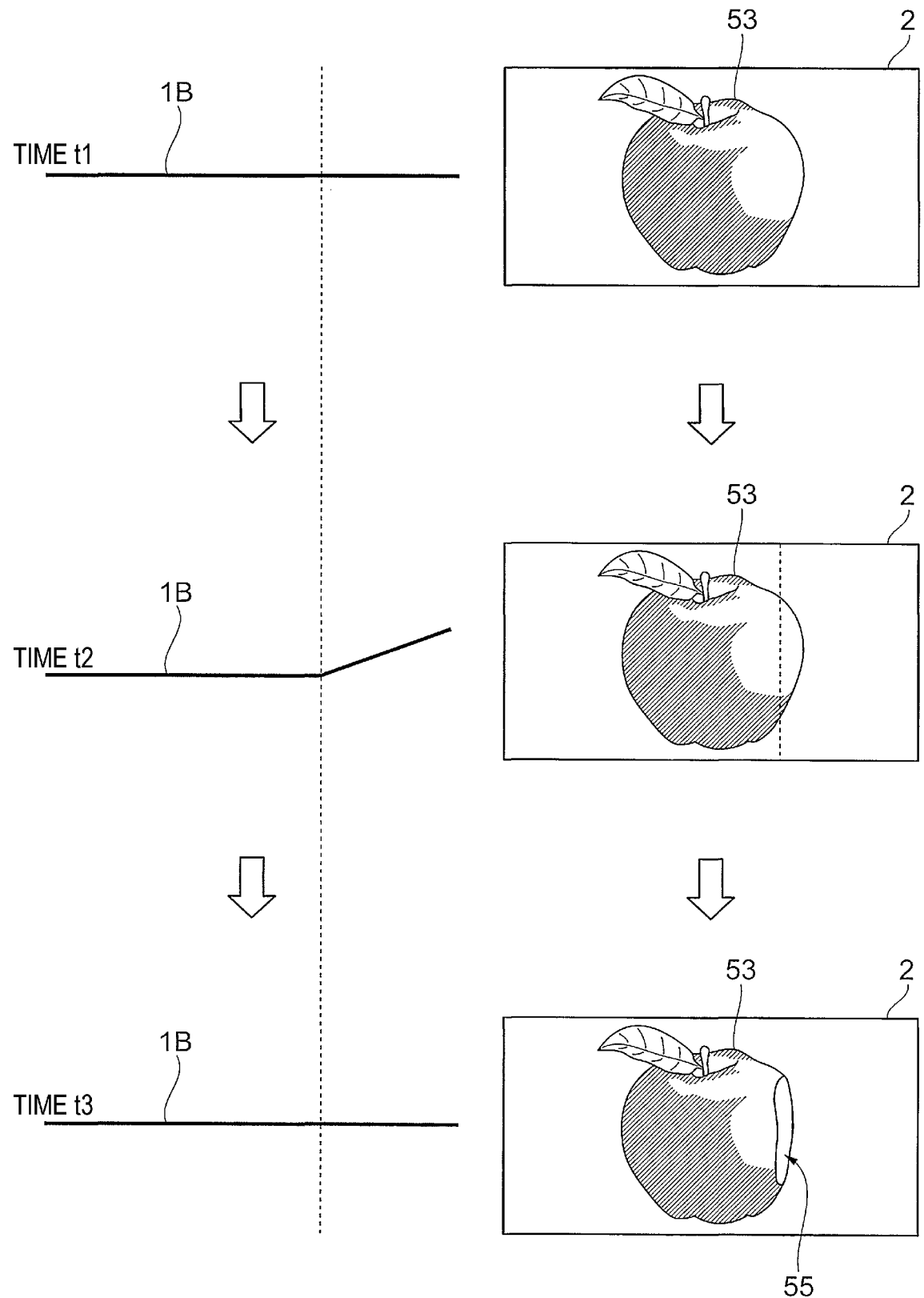
FIG. 25 illustrates another example in which an image of the three-dimensional object is edited by using information on the determined bent position.

FIG. 25 illustrates another example in which an image of the three-dimensional object is edited by using information on the determined bent position.

Also in FIG. 25, no change is made to the three-dimensional image 53 of the three-dimensional object displayed on the display 2 regardless of the bending state of the information processing apparatus 1B at time t1 and time t2.

However, in the case of FIG. 25, after the information processing apparatus 1B has been made flat again, an image in which the three-dimensional image 53 of the three-dimensional object is cut at a part corresponding to the bent position at time t2 is displayed as the three-dimensional image 53 of the three-dimensional object. That is, a cut plane 55 is added.

Although only an image obtained after cutting the three-dimensional image 53 of the three-dimensional object is displayed in the example of FIG. 25, a process from the start to the end of cutting may be displayed as a moving image.

The displaying of the cut plane increases the presence of image processing. In the case of this exemplary embodiment, special effect processing to be performed is specified by a user in advance.

Note that sound effects may be added in accordance with the content of processing at the time of image processing. For example, in the example of FIG. 25, the sound of cutting an apple may be produced as a sound effect from a speaker (not illustrated). The addition of sound effects also increases the presence of image processing.

Other Configurations

Deformation of the information processing apparatus 1B is also usable to control a processing operation of another information processing apparatus.

Figure 26:
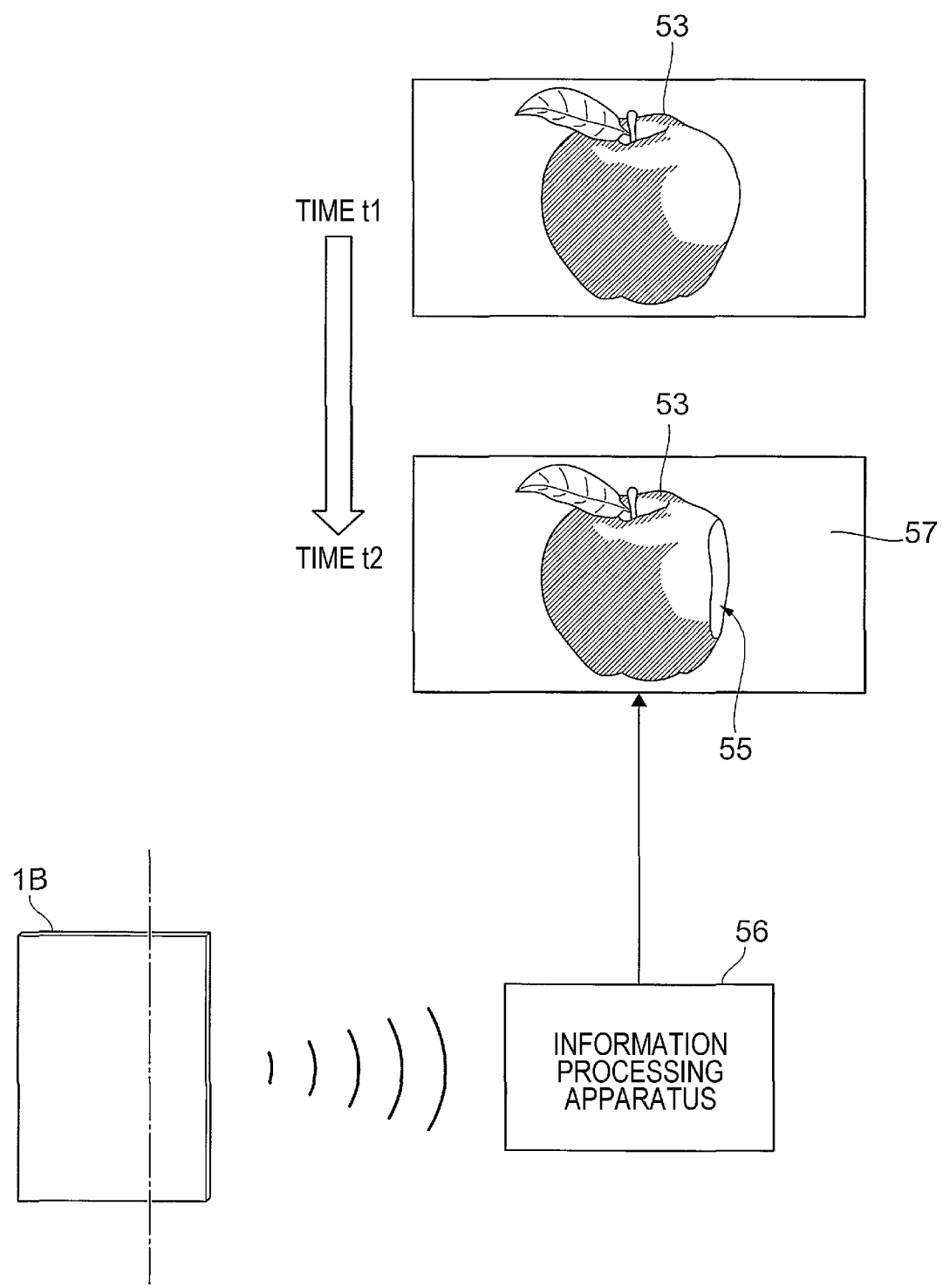
FIG. 26 illustrates an example in which a deformation operation of the information processing apparatus is used to control a display operation of a display device whose display is controlled by another information processing apparatus.

FIG. 26 illustrates an example in which a deformation operation of the information processing apparatus 1B is used to control a display operation of a display device 57 whose display is controlled by another information processing apparatus, an information processing apparatus 56.

In the case of FIG. 26, deformation information detected by the information processing apparatus 1B that is deformable at any position is transmitted to the information processing apparatus 56 through a communication unit, and is used to control a screen displayed on the display device 57 provided on or connected to the information processing apparatus 56.

The information processing apparatus 56 is configured as a so-called computer, and content of an image displayed on the information processing apparatus 1B used as an operation unit may be the same as or different from content of an image displayed on the display device 57 through the information processing apparatus 56.

In the case of FIG. 26, on the basis of deformation information detected by the information processing apparatus 1B from time t1 to time t2, the cut plane 55 is displayed in a part of the three-dimensional image 53 of the three-dimensional object displayed on the display device 57. In other words, a part of the three-dimensional image 53 is deleted.

Figure 27:
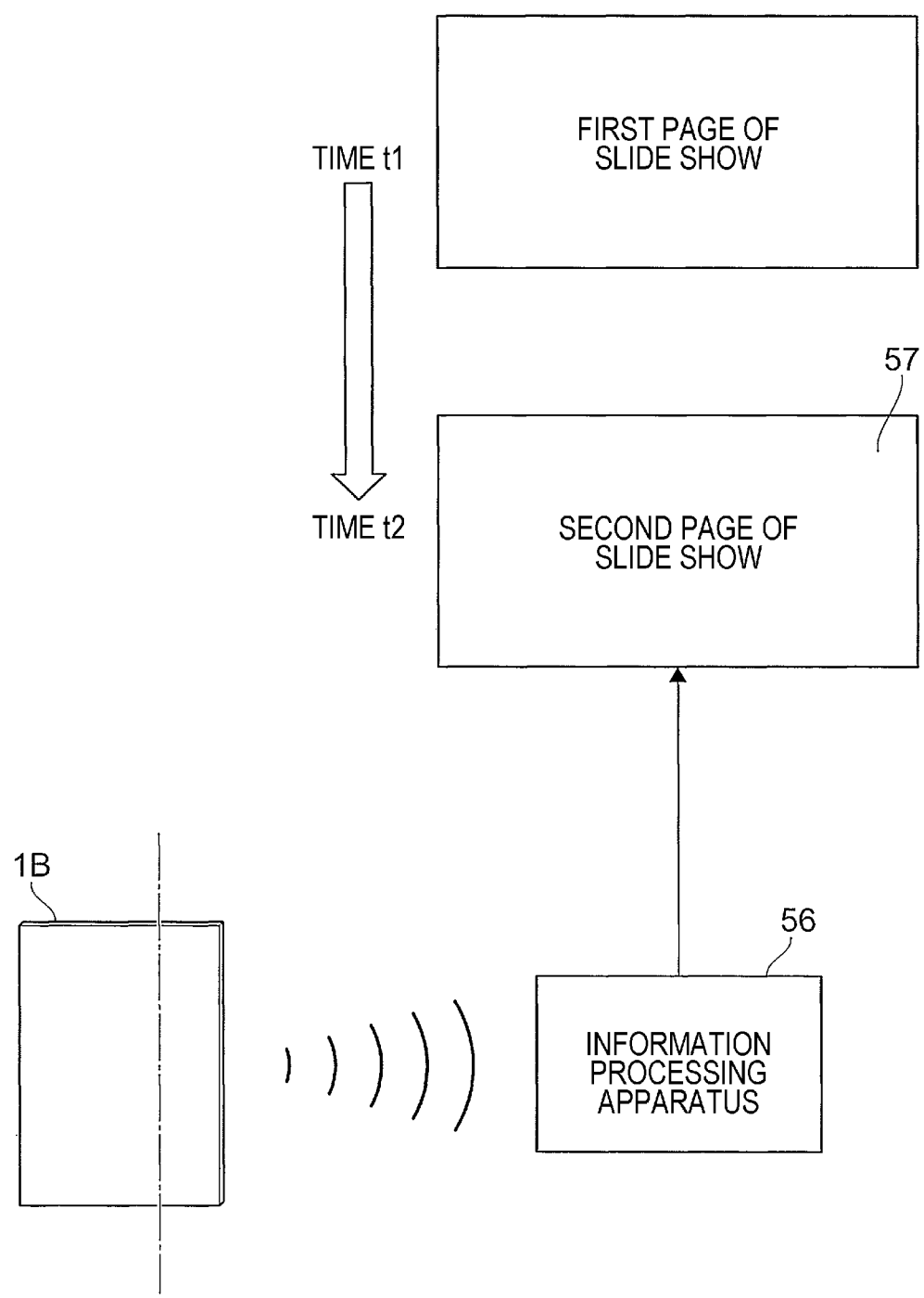
FIG. 27 illustrates another example in which a deformation operation of the information processing apparatus is used to control a display operation of a display device whose display is controlled by another information processing apparatus.

FIG. 27 illustrates another example in which a deformation operation of the information processing apparatus 1B is used to control a display operation of the display device 57 whose display is controlled by another information processing apparatus, which is the information processing apparatus 56.

FIG. 27 illustrates an example in which the information processing apparatus 56 detects deformation of the information processing apparatus 1B as an operation input unit and is used to issue an instruction for starting a slide show or for turning pages displayed on the display device 57.

In the case of FIG. 27, on the basis of deformation information detected by the information processing apparatus 1B from time t1 to time t2, a screen for a slide show is switched from a first page to a second page. In other words, a display image is replaced.

Third Exemplary Embodiment

This exemplary embodiment will describe a case in which a three-dimensional display is used to display an object three-dimensionally.

Figure 28:
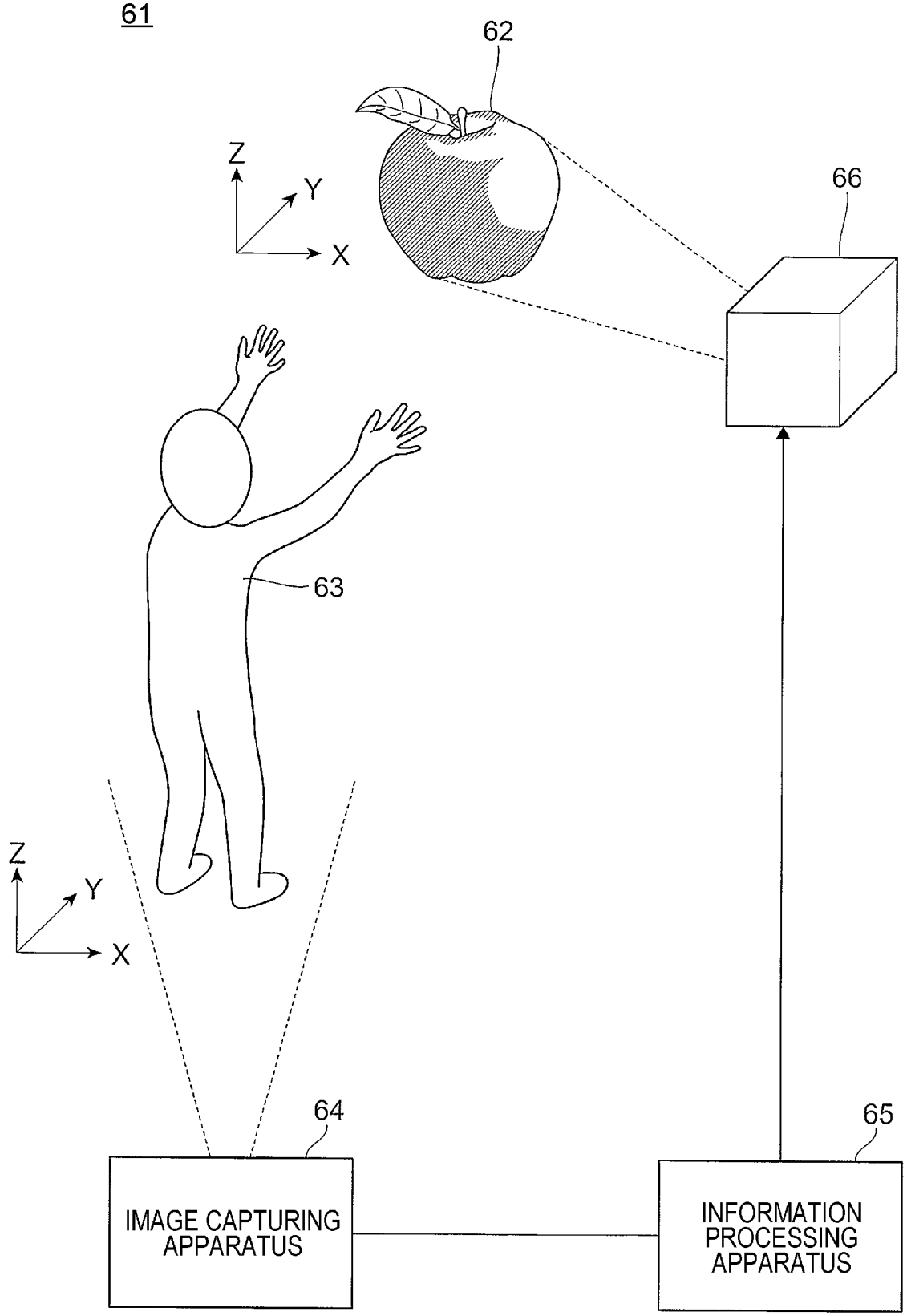
FIG. 28 illustrates an example of a three-dimensional object displayed by a three-dimensional display.

FIG. 28 illustrates an example of a three-dimensional object displayed by a three-dimensional display.

An information processing system 61 illustrated in FIG. 28 includes an image capturing apparatus 64 that captures an image of a user, an information processing apparatus 65, and a three-dimensional space depicting apparatus 66.

The image capturing apparatus 64 is an apparatus that captures an image of the movement of a user 63 as a subject and is a type of sensor.

The information processing apparatus 65 is an apparatus that performs processing for outputting data of the three-dimensional object that is a display target to the three-dimensional space depicting apparatus 66, processing for determining the movement of the user 63 by processing the captured image, image processing on the three-dimensional object in accordance with the determination results, and the like. The information processing apparatus 65 is configured as a so-called computer, and the above-described various kinds of processing are performed by execution of a program.

The three-dimensional space depicting apparatus 66 is configured from, for example, an infrared pulse laser, a lens for adjusting a focal point at which an image is formed with laser beams, a Galvanometer mirror used for planar scanning of laser beams in a space, and the like and depicts a three-dimensional image in the air on the basis of the given data of the three-dimensional object. In the example of FIG. 28, a three-dimensional image 62 of an apple is formed by air plasma emission and is floating in the air as the three-dimensional object.

Although the movement of the user 63 is detected through image processing in this exemplary embodiment, the movement of the user 63 may be detected by using an output from a sensor that detects the movement of the air. Not only the movement of the user 63, but also the body temperature of the user 63, a change thereof, the ambient temperature of the user 63, humidity around the user 63, and a change thereof may be detected through thermography.

Figure 29:
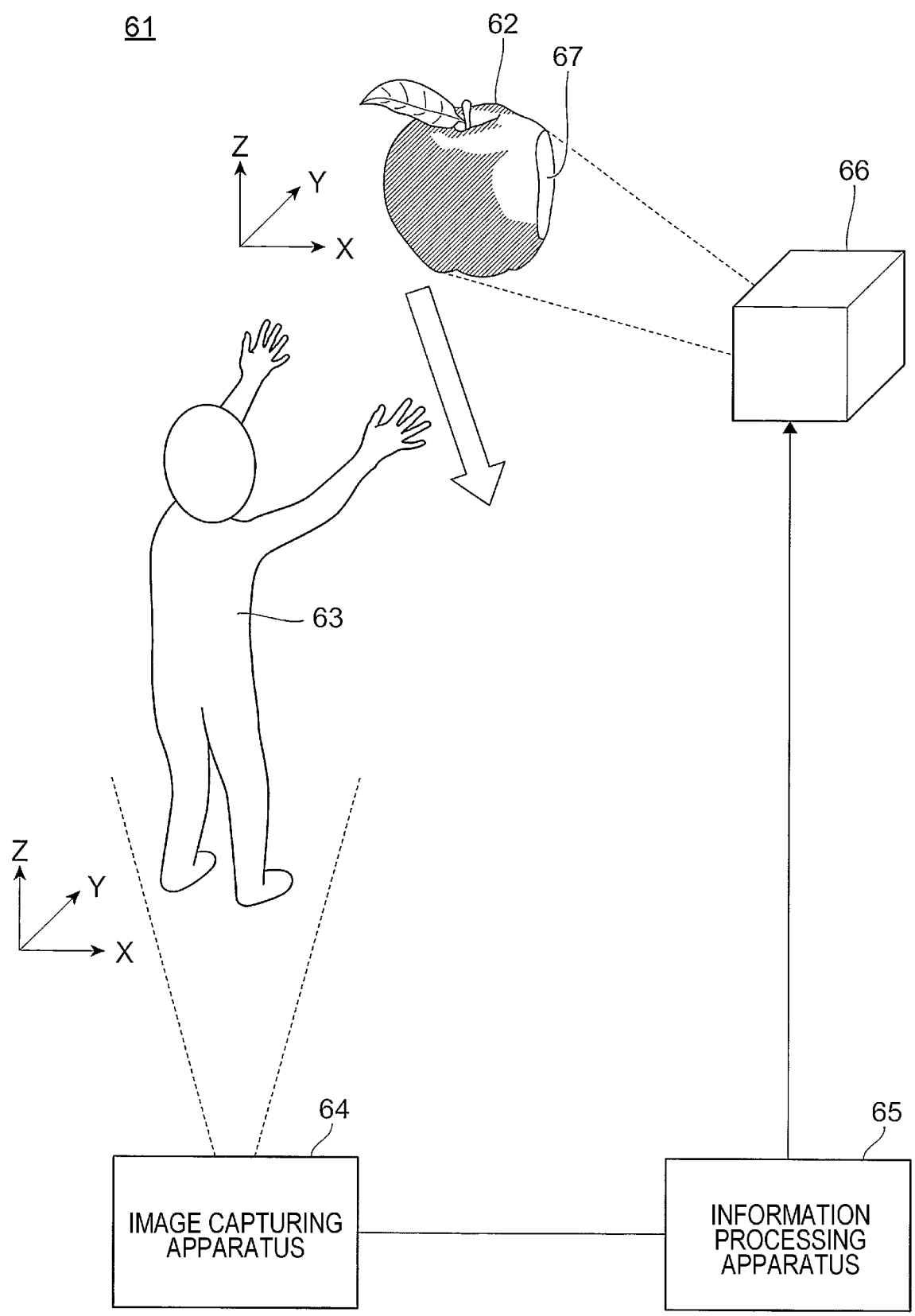
FIG. 29 illustrates a state in which a change is made to a displayed three-dimensional object in response to a specific movement of a user.

FIG. 29 illustrates a state in which a change is made to a displayed three-dimensional object in response to a specific movement of the user.

In FIG. 29, parts corresponding to those in FIG. 28 are denoted by the corresponding reference numerals.

FIG. 29 illustrates a case in which a user moves to vertically cut a specific part of the three-dimensional image 62. The information processing apparatus 65 that detects the movement of the user determines the position of the three-dimensional image 62 to which a change is to be made in response to the movement of the user, and determines a change content. In the case of FIG. 29, the volumes of divisions obtained by dividing the three-dimensional image 62 of the apple along the determined position are calculated from data of the three-dimensional object, and depiction data is generated such that a division having the larger volume is depicted in the air.

Thus, in FIG. 29, a cut plane 67 of a division having the larger volume in the three-dimensional image 62 of the apple is depicted.

Although the cut plane 67 is depicted in this example, the change content may be controlled in any manner in accordance with the three-dimensional object that is depicted as in the case of the first exemplary embodiment.

Figure 30:
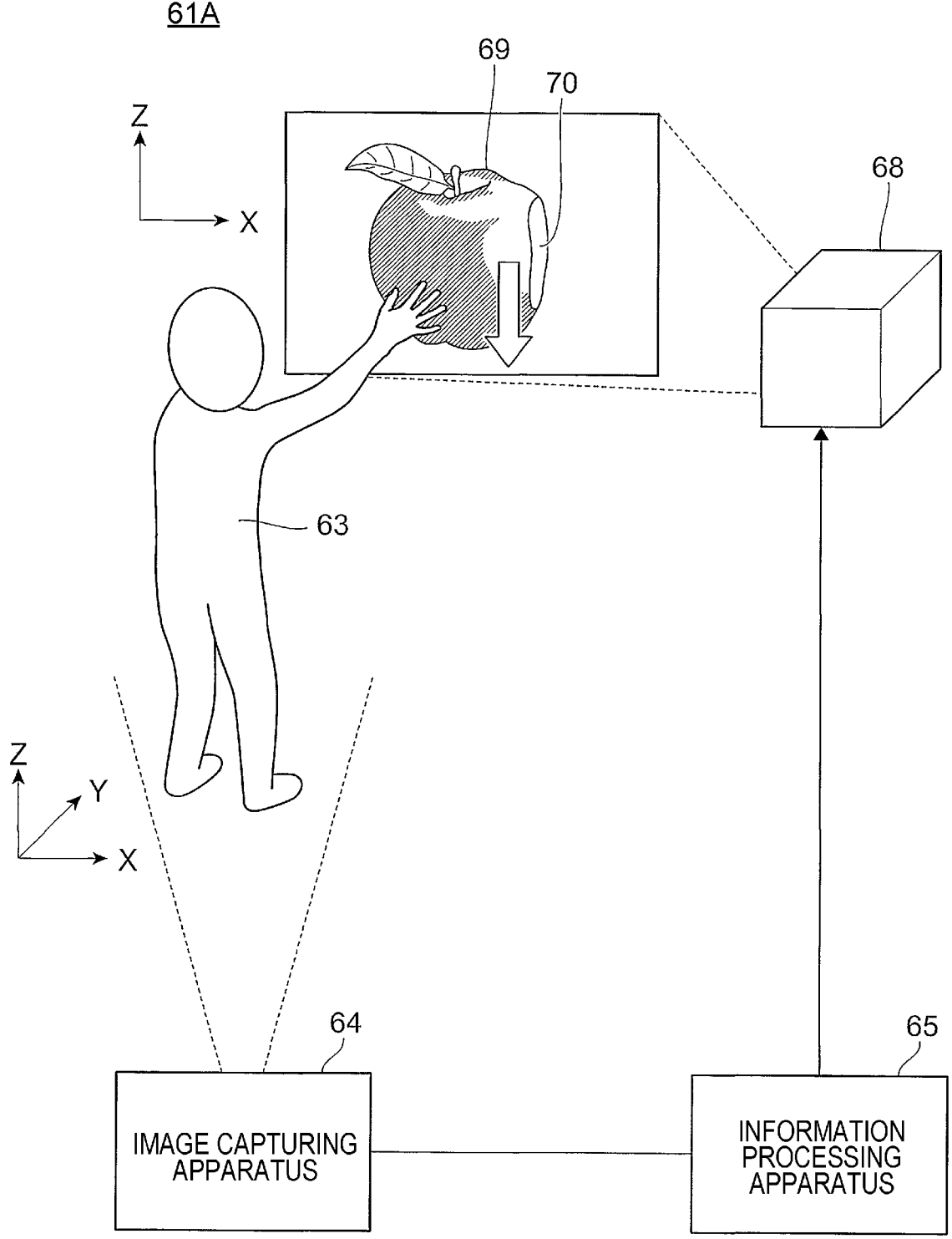
FIG. 30 illustrates an example in which a change is made to a three-dimensional object that is projected onto a wall or a floor.

FIG. 30 illustrates an example in which a change is made to a three-dimensional object that is projected onto a wall or a floor.

In FIG. 30, parts corresponding to those in FIG. 28 are denoted by the corresponding reference numerals.

An information processing system 61A illustrated in FIG. 30 is different from the information processing system 61 in that a projecting apparatus 68 is used in place of the three-dimensional space depicting apparatus 66.

In the case of FIG. 30, the projecting apparatus 68 projects a three-dimensional image 69 of the three-dimensional object onto a wall, which is a two-dimensional space. A user illustrated in FIG. 30 moves his/her right hand from up to down (−Z direction) along the wall, which is a projection plane. The information processing apparatus 65 detects the movement of the user through an infrared sensor (not illustrated) or image processing and makes a change to the three-dimensional image 69 to be projected. In the case of FIG. 30, a cut plane 70 is displayed.

Other Exemplary Embodiments

The exemplary embodiments of the present invention have been described above. However, the technical scope of the present invention is not limited to the above-described exemplary embodiments. It is apparent from the claims that various modifications or improvements of the above-described exemplary embodiments are also included in the technical scope of the present invention.

For example, the color of a specific part of an object that is displayed three-dimensionally may be changed.

In the above-described exemplary embodiments, to a specific part of an object that is displayed three-dimensionally on a display, a change is made by using a sensor such as a sensor that detects the position on a display screen receiving user operations (the position detection sensor 4), a sensor that detects a user operation as pressure (the pressure detection sensor 5, 7A, 7B), or a sensor that detects distortion of a housing (the distortion detection sensor 6 (see FIG. 4)). However, any sensor other than the above-described sensors may be used.

For example, a sensor that measures the elevation of the position where the information processing apparatus 1 is used may be used. Examples of this type of sensor include an altimeter that measures atmospheric pressure to calculate the elevation, a global positioning system (GPS) receiver that calculates the elevation by using GPS signals, and the like. Note that some GPS signals are supposed to be used indoors.

Examples further include an air pressure sensor, an illuminance sensor, a water pressure sensor, a water depth sensor, and the like for measuring the position where the information processing apparatus 1 is used.

In a case of using a sensor that measures the elevation, in accordance with the elevation of the position where the information processing apparatus 1 is used, a change may be made to a specific part or a background of an object displayed on the display 2, or a screen displayed on the display 2 may be changed. For example, at a position where the elevation is high, wings may be added to a part of the object (e.g., the back or arms of a character), clouds may be added to the background of the object, or the screen may be switched to a bird's-eye view looking down upon surrounding landscapes from above or an image of a sky.

In a case of using a sensor that measures the air pressure, a change may be made in such a manner that a part of the object (e.g., the stomach or cheeks of a character) is puffed out or sucked in in accordance with a change in the air pressure value. Alternatively, a change may be made to an image in such a manner that the volume of an object representing a sealed bag, a balloon, or the like is increased or decreased as the air pressure is decreased or increased.

In a case of using an illuminance sensor, a change may be made to a part of an object in accordance with a change in the illuminance value. For example, a character as the object may wear sunglasses in bright locations or may carry a flashlight in dark locations. In addition, the display form of the object or the display content of the screen may be switched between night and day in accordance with the brightness of an ambient environment.

Furthermore, a GPS sensor may be used as the sensor. For example, in a case in which an operation manual of an apparatus is displayed as the object, the language therein may be changed to the first language of the detected country or area.

Contents of questions and answers described in the operation manual or contents related to precautions for operation may be changed on the basis of an output value of a sensor, which changes in accordance with a use environment of the information processing apparatus 1. The change herein includes, for example, a change of the position of description in such a manner that contents that are likely to be referred to in an environment determined on the basis of an output from a sensor are placed in higher levels.

For example, if it is determined that the information processing apparatus 1 is used in a hot and humid environment, a change may be made in such a manner that precautions for a hot and humid environment are placed in higher levels of the operation manual displayed as the object.

Alternatively, for example, pictures in the operation manual may be localized (customized) in accordance with a hot and humid environment.

The above exemplary embodiments have described a case in which each sensor is provided in the information processing apparatus 1. However, a sensor may be independent of the information processing apparatus 1, and an output value of the sensor may be given to the information processing apparatus 1 through a communication unit.

In addition, a change may be made to an object displayed on the information processing apparatus 1 on the basis of environmental information acquired from the outside. The environmental information herein is information that is related to positional information of the information processing apparatus 1 and that is acquirable from the outside and includes, for example, information regarding weather, such as a weather forecast, information regarding crime prevention, such as occurrence of a crime, and information regarding traffic, such as a traffic accident or a traffic jam.

For example, in a state in which a map is displayed on a display screen of the information processing apparatus 1 and in which a character image representing the position of a user (i.e., the position of the information processing apparatus 1) is displayed on the map, upon reception of a high-temperature warning associated with the position of the user, sleeves and cuffs of the character image may be shortened (clothing may be changed to a short-sleeved shirt and shorts), and the body may be sweating.

For example, in a state in which a map is displayed on a display screen of the information processing apparatus 1 and in which a character image representing the position of a user (i.e., the position of the information processing apparatus 1) is displayed on the map, upon reception of a notification of occurrence of a crime in an area associated with the position of the user, a change may be made in such a manner that the character's expression is changed to a frightened expression or the character's body is trembling.

For example, upon reception of a notification of occurrence of a traffic accident, a change may be made to the display in the same manner.

Note that if plural pieces of environmental information are acquired together, the display content may be changed by combining changes corresponding to the plural pieces of environmental information. For example, if the above high-temperature warning and the above notification of occurrence of a crime are both acquired, a change may be made in such a manner that a character wears light clothing, is sweating, and has a frightened expression.

In addition, a change may be made to the displayed object by combining information acquired by the sensor and environmental information.

In the above-described exemplary embodiments, in principle, a specific change is made to the display by using a physical quantity measured by each sensor. However, outputs from plural sensors may be combined to make a change to the display. The physical quantity herein may include pressure, acceleration, temperature, humidity, air pressure, elevation, water depth, magnetic pole, sound, positional information, and the like, which are measurement targets. The physical quantity herein may further include a change in an electrical signal (current or voltage) that appears in the sensor.

For example, four pieces of information, which are temporal information, an elevation value, a temperature value, and an illuminance, may be combined to determine a use environment of the information processing apparatus 1, and in accordance with the determined use environment (e.g., mountain in summer), a change may be made to a part of the object or to a screen.

Alternatively, for example, the clothing of a character as the object may be changed to clothing in a summer resort or clothing for climbing a mountain in summer, and an image displayed on the display 2 may be changed to an image of a summer sky.

Further alternatively, creatures that live in water areas corresponding to the determined water depth and water temperature may be displayed on the display 2 by combining the water depth and the temperature value, and a change may be made to the display form of the object.

In the above-described exemplary embodiment, a character, an apple, and the like are used as examples of the three-dimensional object. However, the object that is displayed three-dimensionally is not limited to these. For example, an hourglass representing the lapse of time and a set of antennas representing the intensity of radio waves are also examples of the three-dimensional object.

In addition, the three-dimensional object as a display target may be a product such as a built-in device, equipment, or a machine that operates in accordance with software such as firmware. In this case, if design information of the product (e.g., computer-aided design (CAD) data or performance information of constituents) is available, such information and output values from sensors may be combined in the display.

For example, if the thermal expansion coefficient or the like of each component to be configured or each member to be attached or detached is acquirable by the information processing apparatus 1 and temperature information is acquired from a sensor, the shape of each component of a displayed object may be changed in accordance with the acquired information. In this case, the changed shape may be emphasized in the display.

Such a display function enables a change in the display in such a manner that the shape of some of the components is expanded if the ambient temperature of the information processing apparatus 1 is high. This display equals to a simulation of a future change of a product under the current environment. Although typical simulations require inputs of temperature conditions and the like, this display function enables checking of a change to be generated in the product by only displaying the target product on a screen on-site.

In addition, if the ambient temperature of the information processing apparatus 1 is low, this display function enables estimation of increased viscosity of a lubricant and a change of the movement of a product displayed on a screen as a change to hardware.

With this display function, an abnormality of hardware movement due to an influence of a use environment on software or a malfunction of software may be represented as a change to a displayed object. For example, if the ambient environment of the information processing apparatus 1 is humid and hot, it is possible to estimate a short circuit of an electrical circuit configuring an object or thermal runaway of a CPU and to change the movement of the object on a display screen to movement that is unique to malfunction (e.g., screen blackout or error message display).

Note that the change of a displayed object based on information acquired by various sensors may be realized by using, for example, a correspondence table 60 illustrated in FIG. 31.

FIG. 31 illustrates an example of the correspondence table 60 representing a correspondence relationship between objects as change targets in combination with numbers of dimensions of sensor values and changed images.

The correspondence table 60 includes objects as change targets displayed as, in addition to three-dimensional images, one-dimensional images and two-dimensional images. That is, although the above exemplary embodiments have described cases in which a change is made to displayed three-dimensional objects, the number of dimensions of an object as a display target may be any number as long as the display is capable of displaying the object. In addition, if changed images corresponding to the respective numbers of dimensions are prepared, displayed images may be changed on the basis of outputs from various sensors or the like.

On the other hand, sensor values are classified according to the number of dimensions of acquired information. Specifically, one-dimensional sensor values 72 correspond to cases in which sensor values are one-dimensional, two-dimensional sensor values 73 correspond to cases in which sensor values are two-dimensional, and three-dimensional sensor values 74 correspond to cases in which sensor values are three-dimensional.

The classification into the one-dimensional sensor values 72, the two-dimensional sensor values 73, and the three-dimensional sensor values 74 herein may be based on the number of dimensions in a three-dimensional space, for example.

For example, if a physical quantity detected by a single sensor corresponds to one dimension (e.g., X-axis direction) in a three-dimensional space, an output value of this sensor is included in the one-dimensional sensor values 72. Note that, even if two sensors detect different physical quantities, as long as the respective physical quantities correspond to the same dimension (e.g., X-axis direction), output values of the two sensors are the one-dimensional sensor values 72.

Similarly, if, for example, a physical quantity detected by a single sensor corresponds to two dimensions (e.g., X-axis direction and Y-axis direction) in a three-dimensional space, an output value of this sensor is included in the two-dimensional sensor values 73. In addition, if two sensors detect one-dimensional physical quantities in different directions (e.g., one is X-axis direction and the other is Y-axis direction), output values of the two sensors are the two-dimensional sensor values 73.

Similarly, if, for example, a physical quantity detected by a single sensor corresponds to three dimensions (e.g., X-axis direction, Y-axis direction, and Z-axis direction) in a three-dimensional space, an output value of this sensor is included in the three-dimensional sensor values 74. In addition, if three sensors detect one-dimensional physical quantities in different directions (e.g., one is X-axis direction, another one is Y-axis direction, and the other is Z-axis direction), output values of the three sensors are the three-dimensional sensor values 74.

Alternatively, the classification into the one-dimensional sensor values 72, the two-dimensional sensor values 73, and the three-dimensional sensor values 74 herein may be based on the number of dimensions of information, for example.

For example, if a change is to be made to a displayed object in accordance with a combination of output values of two sensors that output a single value, the two sensor values are the two-dimensional sensor values 73. In addition, if a single sensor outputs two values, the two sensor values output from the single sensor are the two-dimensional sensor values 73. The plural output values herein may correspond to the same physical quantity or different physical quantities.

Further alternatively, the classification into the one-dimensional sensor values 72, the two-dimensional sensor values 73, and the three-dimensional sensor values 74 may be based on a combination of the number of dimensions of a three-dimensional space and the number of dimensions of information, for example.

In the example of FIG. 31, plural changed images 1 to N with respect to images of the respective numbers of dimensions are associated with the levels of sensor values of the respective numbers of dimensions.

For example, for the one-dimensional sensor values 72, in accordance with differences of the levels, N changed images 1 are associated with one-dimensional images, N changed images 4 are associated with two-dimensional images, and N changed images 7 are associated with three-dimensional images.

For example, for the two-dimensional sensor values 73, in accordance with differences of combinations of the levels, M changed images 2 are associated with one-dimensional images, M changed images 5 are associated with two-dimensional images, and M changed images 8 are associated with three-dimensional images.

Similarly, for the three-dimensional sensor values 74, in accordance with differences of combinations of the levels, L changed images 3 are associated with one-dimensional images, L changed images 6 are associated with two-dimensional images, and L changed images 9 are associated with three-dimensional images.

Although the same number of changed images are associated for each number of dimensions of sensor values regardless of the number of dimensions of images in the example of FIG. 31, different numbers of changed images may be assigned in accordance with combinations. In addition, the number of changed images may be determined in accordance with, instead of the number of dimensions of sensor values, the number of dimensions of images.

The above exemplary embodiments have described cases in which a single object is displayed on a screen for simplicity of description. However, plural objects may be displayed. In this case, it is possible to depict plural objects in the same dimension or in different dimensions. For example, if it is possible to depict images in three dimensions, some objects may be displayed three-dimensionally, and the other objects may be displayed two-dimensionally or one-dimensionally. Note that all of the objects may be displayed in dimensions whose number is smaller than the number of possible dimensions.

In this case, a change may be made to each image in accordance with the number of dimensions used for depicting the image.

In addition, although a change in accordance with a sensor value may be made to each image corresponding to one of plural objects, the change may be made only to a specific object specified by a user among the plural objects or an image corresponding to a specific dimension or dimensions. For example, if there are both three-dimensionally depicted object images and two-dimensionally depicted object images, a change may be made only to three-dimensionally depicted object images, which are specified by a user.

The above exemplary embodiments have described cases in which changes are made to the display of the information processing apparatus 1. However, an output to an image forming apparatus (so-called printer) may reflect such a change in the display. For example, if a print instruction is issued in a state in which a change is made to a displayed three-dimensional object in accordance with a sensor output value, print data corresponding to the changed content may be generated to print an image. That is, not only image display, but also printing may reflect a sensor output value.

Note that a change in the display may be independent of content of the image to be printed. That is, even if a change is made to a displayed object, content to be printed may be content of the three-dimensional object before a change is made in accordance with a sensor output value. In this case, it is desirable that a user be allowed to select on a user interface screen, whether an image including display content that has been changed in accordance with the sensor output value is to be printed or an image including content before a change is made in accordance with the sensor output value is to be printed.

The user interface screen herein may be prepared as a setting screen or a part of a confirmation screen displayed in a pop-up window each time a print instruction is issued.

To print an image on a sheet of paper, the information processing apparatus 1 converts three-dimensional information defining the three-dimensional object into two-dimensional information. The two-dimensional information herein may be, for example, an image obtained by observing the surface of the three-dimensional object, or an image reflecting a change in an internal structure of the three-dimensional object as illustrated in FIG. 24 or the like.

Note that the so-called printer may be, in addition to an apparatus that prints a two-dimensional image on a recording medium such as a sheet of paper, a three-dimensional printer that forms a three-dimensional image. If the output destination is a three-dimensional printer, the three-dimensional object is output as a three-dimensional object without being converted into three-dimensional information.

In the above-described exemplary embodiments, a mobile information terminal such as a tablet computer or a smartphone is assumed as the information processing apparatus 1. However, the above technique is applicable to any information terminal including a display (including projection function) and a sensor, such as a clock, a toy like a game machine, a television receiver, a projector, a head-mounted display, an image forming apparatus (so-called printer), an electronic white board, or a robot for communication.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display that displays an image of an object three-dimensionally;
at least one detector that detects a physical quantity as a detection target; and
a display controller that makes a change to a specific part of the object displayed on the display in accordance with an output from the at least one detector, wherein the at least one detector detects a position where the display, which is deformable, is deformed, in a state in which the display is deformed from a first shape before bending into a second shape after bending, the display controller does not edit the image of the object displayed on the display across the bent position, and after the display is made into the first shape again from the second shape, the display controller generates an image in which the image of the object is cut three-dimensionally along the bent position and displays the image, and a cut plane is displayed in a part of the image of the object displayed three-dimensionally.

2. The information processing apparatus according to claim 1,
wherein, on the basis of a position at which the at least one detector detects pressure, the display controller determines the part to which the change is to be made.

3. The information processing apparatus according to claim 2,
wherein the display controller changes a degree of the change to be made to the object in accordance with a strength of the detected pressure.

4. The information processing apparatus according to claim 3,
wherein the strength is a total of results of a plurality of times of detection.

5. The information processing apparatus according to claim 3,
wherein display content of the specific part is changed in accordance with a temporal change of the strength.

6. The information processing apparatus according to claim 2,
wherein the at least one detector comprises a plurality of detectors, and
wherein the display controller calculates a direction of an external force that acts on the object on the basis of a distribution of strengths of pressure detected by the plurality of detectors.

7. The information processing apparatus according to claim 1,
wherein, on the basis of a direction of acceleration detected by the at least one detector, the display controller determines the part to which the change is to be made ill the object displayed on the display.

8. The information processing apparatus according to claim 7,
wherein the degree of the change to be made to the object is changed in accordance with a degree of the detected acceleration.

9. The information processing apparatus according to claim 1,
wherein the at least one detector comprises a plurality of detectors at different parts, and wherein, on the basis of humidities detected by the plurality of detectors, the display controller determines the part to which the change is to be made in the object displayed on the display.

10. The information processing apparatus according to claim 9,
wherein, if one of the detected humidities exceeds a predetermined threshold, the display controller makes the change in such a manner that the determined part of the object is displayed to be wet.

11. The information processing apparatus according to claim 9,
wherein, if one of the detected humidities exceeds a predetermined threshold, the display controller makes the change in such a manner that clothing or footwear at the determined part is suitable for rainy weather or waterside.

12. The information processing apparatus according to claim 1,
wherein the at least one detector comprises a plurality of detectors at different parts, and
wherein, on the basis of temperatures detected by the plurality of detectors, the display controller determines the part to which the change is to be made in the object displayed on the display.

13. The information processing apparatus according to claim 1,
wherein the at least one detector comprises a plurality of detectors at different parts, and
wherein, on the basis of information on distortion detected on the basis of outputs from the plurality of detectors, the display controller determines the part to which the change is to be made in the object displayed on the display.

14. The information processing apparatus according to claim 13,
wherein the display controller changes a degree of the change to be made to the object in accordance with a degree of the detected distortion.

15. The information processing apparatus according to claim 1,
wherein the at least one detector comprises a plurality of detectors, and
wherein, in accordance with a combination of a plurality of kinds of outputs from the plurality of detectors, the display controller makes the change to the specific part of the object displayed on the display.

16. The information processing apparatus according to claim 1,
wherein, in accordance with a combination of environmental information acquired from an outside and an output from the at least one detector, the display controller makes the change to the specific part of the object displayed on the display.

17. The information processing apparatus according to claim 1,
wherein the display controller outputs, to an image forming apparatus, print data corresponding to the object to which the change has been made, the object being displayed on the display.

18. The information processing apparatus according to claim 1,
wherein the display controller outputs, to an image forming apparatus, print data of the object that is prepared in advance regardless of a display state, even if the object to which the change has been made is displayed on the display.

19. The information processing apparatus according to claim 1,
wherein the display controller estimates a state of an actual product corresponding to the object under a use environment determined on the basis of an output from the at least one detector and reflects and displays the state.

20. The information processing apparatus according to claim 1,
wherein the at least one detector detects a position where the display, which is deformable, is deformed, and
wherein the display controller determines the part to which the change is to be made in accordance with the detected position.

* * * * *